US012646882B2

(12) United States Patent
Hashiguchi

(10) Patent No.: US 12,646,882 B2
(45) Date of Patent: Jun. 2, 2026

(54) CONNECTOR AND MANUFACTURING METHOD THEREOF

(71) Applicant: Japan Aviation Electronics Industry, Ltd., Tokyo (JP)

(72) Inventor: Osamu Hashiguchi, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 548 days.

(21) Appl. No.: 18/157,106

(22) Filed: Jan. 20, 2023

(65) Prior Publication Data

US 2023/0283007 A1 Sep. 7, 2023

(30) Foreign Application Priority Data

Mar. 7, 2022 (JP) ................................ 2022-034069

(51) Int. Cl.

| | |
|---|---|
| ***H01R 13/40*** | (2006.01) |
| ***H01R 12/57*** | (2011.01) |
| ***H01R 12/58*** | (2011.01) |
| ***H01R 12/71*** | (2011.01) |
| ***H01R 13/405*** | (2006.01) |
| ***H01R 13/502*** | (2006.01) |
| *H01R 13/516* | (2006.01) |

(52) U.S. Cl.

CPC ........... *H01R 13/405* (2013.01); *H01R 12/57* (2013.01); *H01R 12/58* (2013.01); *H01R 12/716* (2013.01); *H01R 13/502* (2013.01); *H01R 13/516* (2013.01)

(58) Field of Classification Search

CPC ...... H01R 13/405; H01R 12/57; H01R 12/58; H01R 12/716; H01R 13/502; H01R 13/516; H01R 12/73; H01R 43/24; H01R 12/71; H01R 13/24; H01R 13/2492

See application file for complete search history.

(56) References Cited

U.S. PATENT DOCUMENTS

| | | | | |
|---|---|---|---|---|
| 5,975,959 A | | 11/1999 | Joly | |
| 6,503,101 B1 | * | 1/2003 | Yu ...................... | H01R 13/6597 439/108 |
| 9,728,873 B2 | * | 8/2017 | Komoto ............... | H01R 13/405 |

(Continued)

FOREIGN PATENT DOCUMENTS

| | | |
|---|---|---|
| CN | 102457007 A | 5/2012 |
| JP | H10-189079 A | 7/1998 |
| JP | 2020-181803 A | 11/2020 |

OTHER PUBLICATIONS

Japanese Office Action in counterpart Japan Patent Application No. 2022-034069 issued on Nov. 4, 2025, with English Translation.

*Primary Examiner* — Truc T Nguyen

(74) *Attorney, Agent, or Firm* — Renner, Otto, Boisselle & Sklar, LLP

(57) ABSTRACT

An accommodating step accommodates a plug contact assembly into an injection mold in such a way that the plug contact assembly is supported at both ends in the injection mold by using two supporting parts. An insert molding step molds a plug housing integrally with the plug contact assembly by insert molding in such a way that a coupling beam of the plug contact assembly is between two width side surfaces and separated from the two width side surfaces in the width direction. A separation step removes at least part of the plug contact assembly to as to disjoin the plurality of plug contacts.

14 Claims, 39 Drawing Sheets

(56) References Cited

U.S. PATENT DOCUMENTS

| | | | | |
|---|---|---|---|---|
| 11,735,867 | B2 * | 8/2023 | Chen | H01R 13/6585 439/607.05 |
| 2005/0095913 | A1 * | 5/2005 | Fan | H01R 13/658 439/607.35 |
| 2009/0061655 | A1 * | 3/2009 | Miyazaki | H01R 13/20 439/74 |
| 2011/0250800 | A1 * | 10/2011 | Guo | H01R 12/73 439/660 |
| 2016/0172804 | A1 * | 6/2016 | Wu | H01R 24/60 29/883 |
| 2018/0040971 | A1 * | 2/2018 | Phillips | H01R 13/26 |
| 2020/0343659 | A1 | 10/2020 | Gondo | |
| 2021/0351528 | A1 | 11/2021 | Gondo | |

* cited by examiner

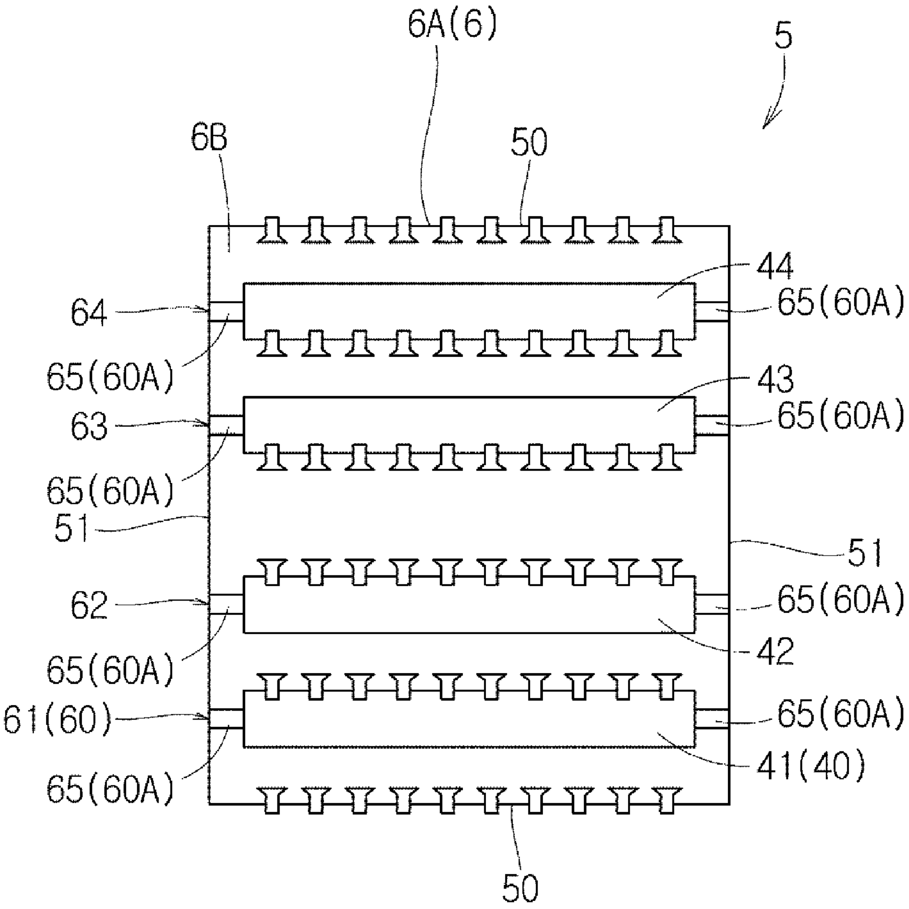
Fig. 12
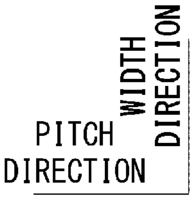

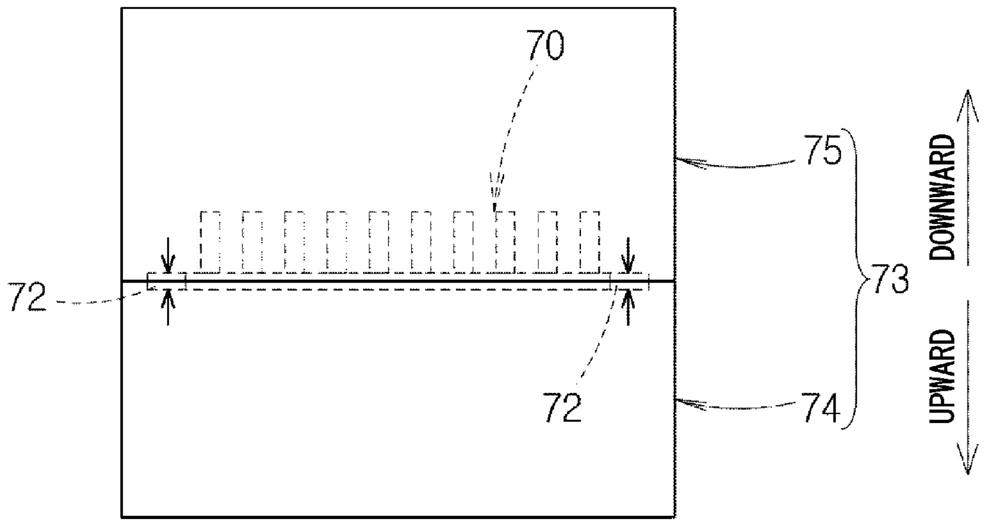
Fig. 16
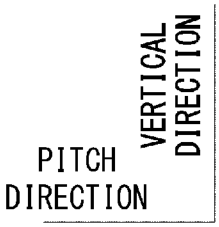

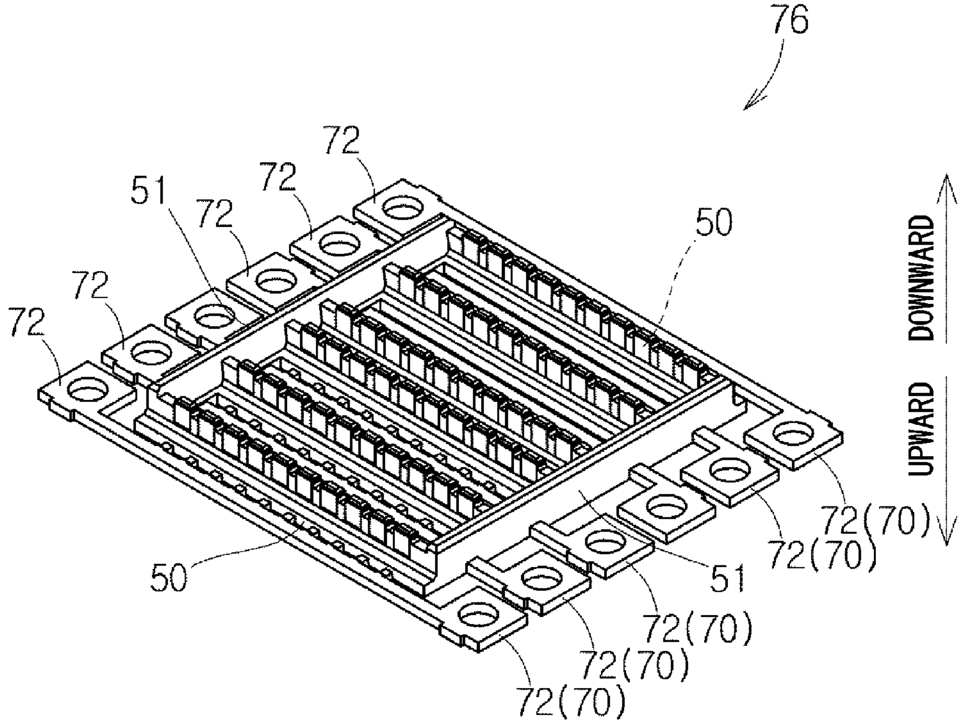
Fig. 17
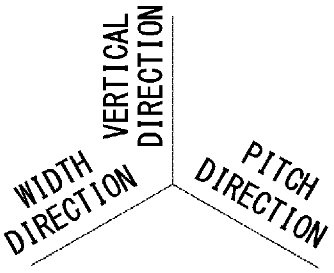

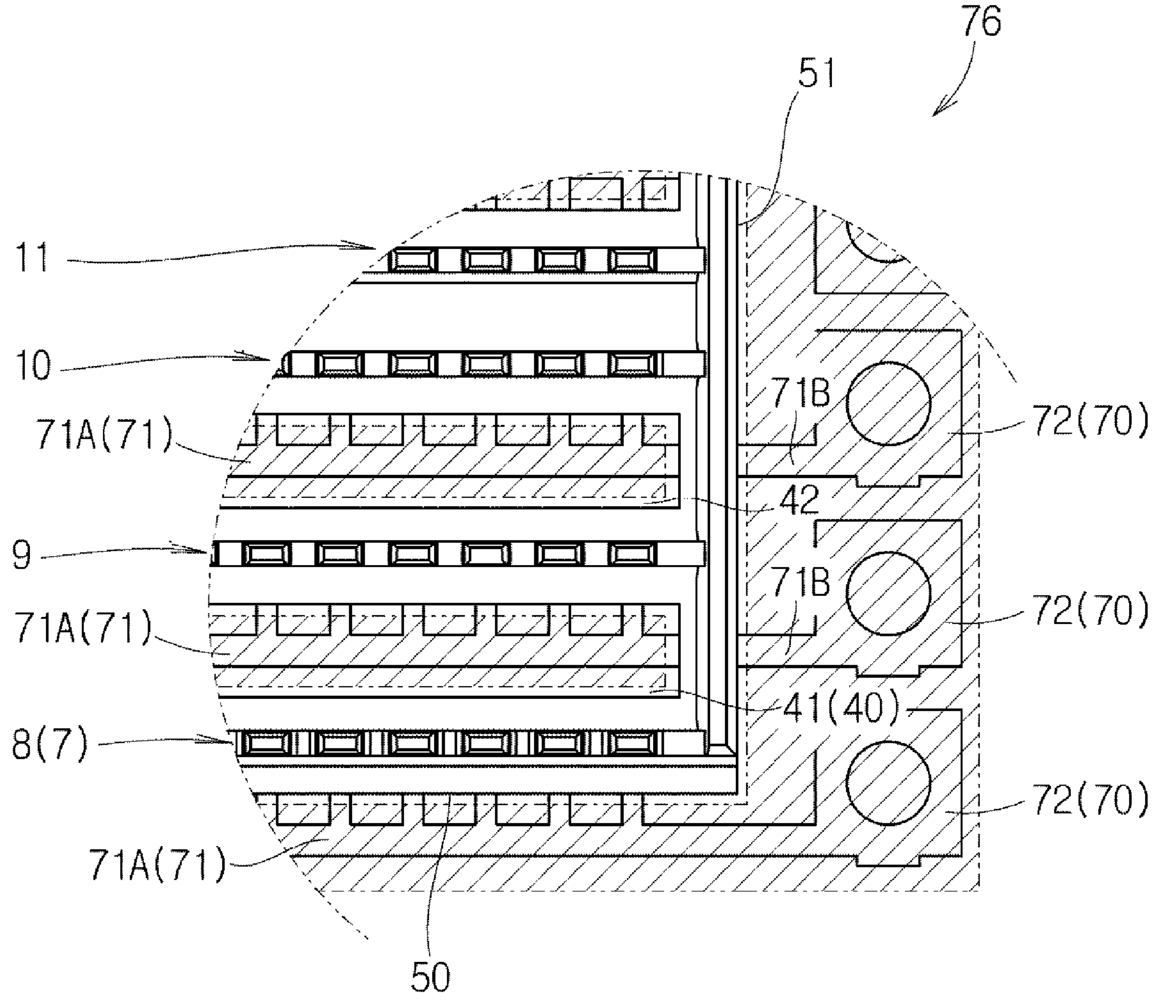
Fig. 19
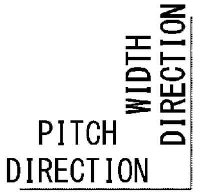

CONNECTOR AND MANUFACTURING METHOD THEREOF

INCORPORATION BY REFERENCE

This application is based upon and claims the benefit of priority from Japanese patent application No. 2022-034069, filed on Mar. 7, 2022, the disclosure of which is incorporated herein in its entirety by reference.

BACKGROUND

The present invention relates to a connector and a manufacturing method of the same.

As shown in FIG. 39 of the present application, in Patent Literature 1 (Japanese Unexamined Patent Application Publication No. 2020-181803), when molding a housing 1001 having a plurality of contacts 1000, the plurality of contacts 1000 are held by a carrier 1002. The carrier 1002 is cut off after insert molding.

SUMMARY

One of the objects of the present disclosure is to provide a novel manufacturing method and a novel structure of a connector formed by integrally molding a contact array and a housing that holds the contact array by insert molding.

According to a first aspect of the present disclosure, there is provided a manufacturing method of a connector, the connector including at least one contact array including a plurality of contacts and a housing holding the at least one contact array, the at least one contact array and the housing being integrally formed by insert molding, and an outer peripheral surface of the housing including two width side surfaces oppositely oriented to each other in a width direction orthogonal to a pitch direction of the at least one contact array, the method including an assembly manufacturing step of manufacturing at least one contact assembly including the at least one contact array, a coupling beam coupling the plurality of contacts of the at least one contact array with one another, and two supporting parts with the coupling beam interposed therebetween in the pitch direction; an accommodating step of accommodating the at least one contact assembly into an injection mold in such a way that the at least one contact assembly is supported at both ends in the injection mold by using the two supporting parts; an insert molding step of molding the housing integrally with the at least one contact assembly by insert molding in such a way that the coupling beam of the at least one contact assembly is between the two width side surfaces and separated from the two width side surfaces in the width direction; and a separation step of removing at least part of the at least one contact assembly so as to disjoin the plurality of contacts.

According to a second aspect of the present disclosure, there is provided a connector including at least one contact array including a plurality of contacts; and a housing holding the at least one contact array, the at least one contact array and the housing being integrally formed by insert molding, and an outer peripheral surface of the housing including two pitch side surfaces oppositely oriented to each other in a pitch direction of the at least one contact array, wherein the housing includes at least one penetrating hole vertically penetrating the housing, and at least one pitch extension groove extending from one to another one of the two pitch side surfaces, and the plurality of contacts of the at least one contact array project inside the at least one penetrating hole or have a sectional surface being flush with an inner peripheral surface of the at least one penetrating hole.

According to the present disclosure, there are provided a novel manufacturing method and a novel structure of a connector formed by integrally molding a contact array and a housing that holds the contact array by insert molding.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 12 is a bottom view of the plug connector (first embodiment);

FIG. 16 is a front view of the injection mold that accommodates the plurality of plug contact assemblies (first embodiment);

FIG. 17 is a perspective view of a molded product retrieved from the injection mold (first embodiment);

FIG. 19 is a plan view of the molded product where an area to be removed is indicated by hatching (first embodiment);

DESCRIPTION OF EMBODIMENTS

First Embodiment

A first embodiment of the present disclosure will be described hereinafter with reference to FIGS. 1 to 22.

Figure 1:
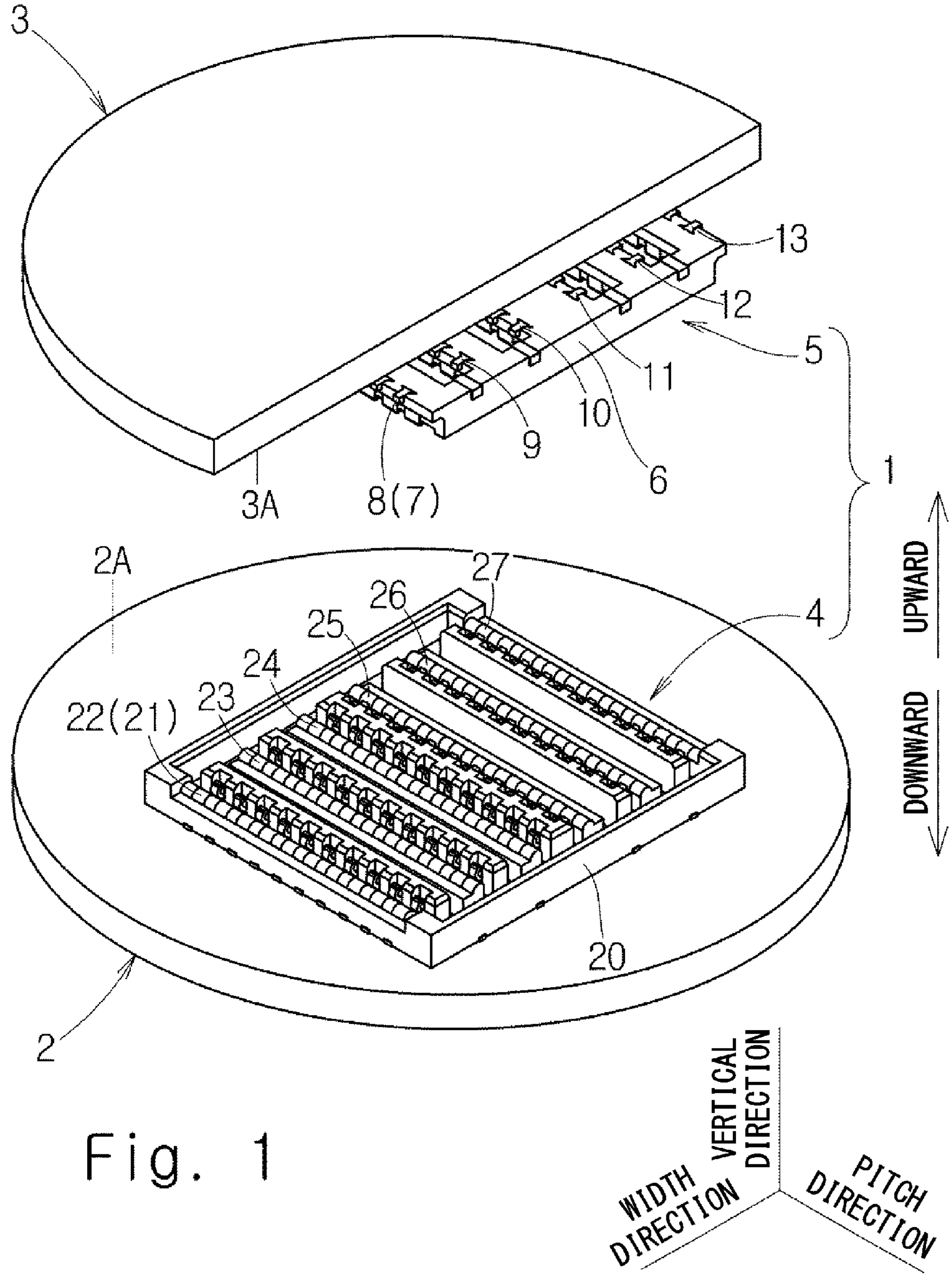
FIG. 1 is a perspective view of a connector assembly (first embodiment)
Figure 2:
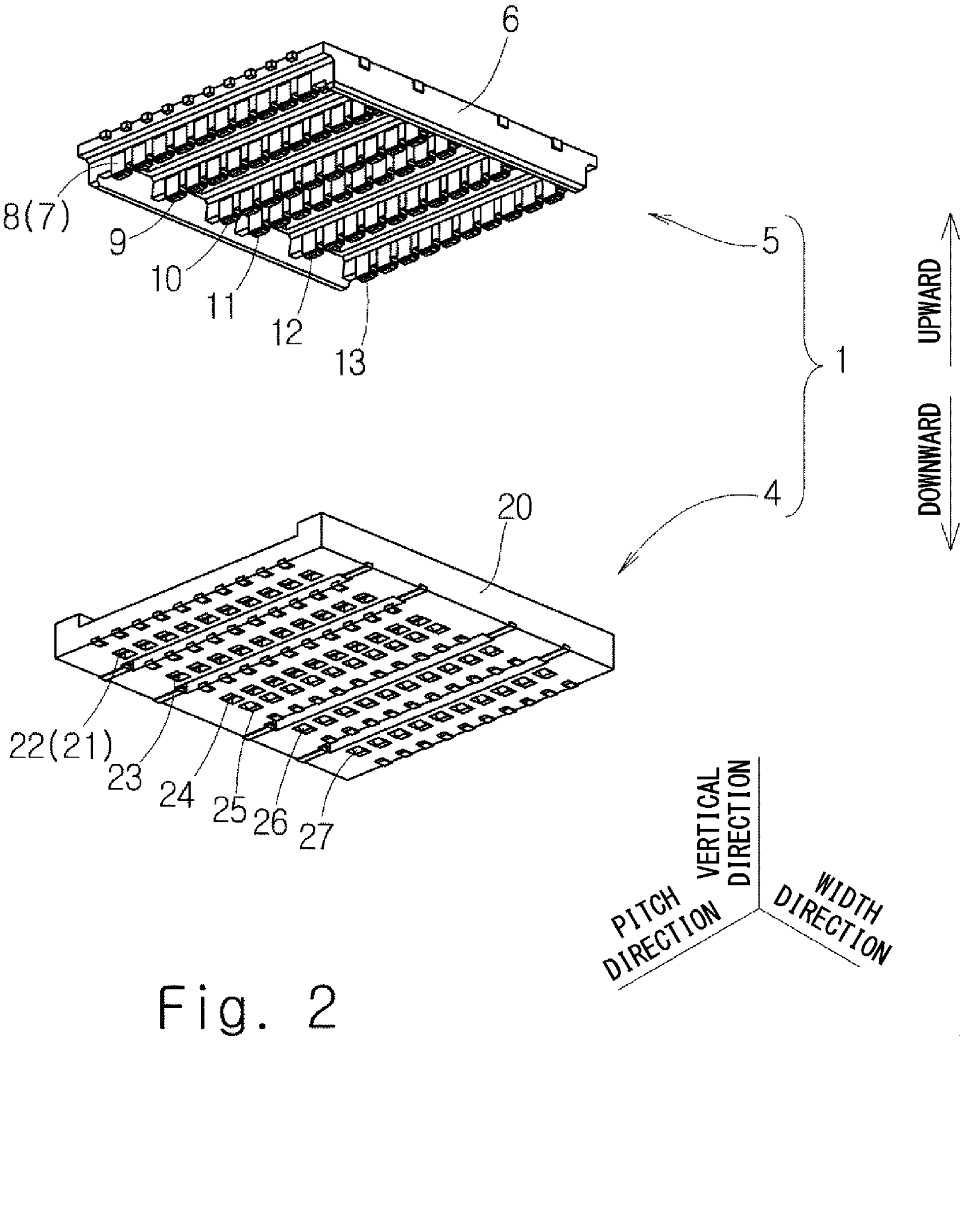
FIG. 2 is a perspective view of the connector assembly when viewed from another angle (first embodiment)

FIGS. 1 and 2 show a connector assembly 1. As shown in FIGS. 1 and 2, the connector assembly 1 mechanically and electrically connects a lower board 2 (receptacle side board, first board, board) and an upper board 3 (plug side board, second board, board). The connector assembly 1 includes a receptacle 4 (receptacle connector, connector) that is surface-mounted on a connector mounting surface 2A of the lower board 2 and a plug 5 (plug connector, connector) that is surface-mounted on a connector mounting surface 3A of the upper board 3. The connector assembly 1 according to this embodiment is a fine pitch and low profile surface-mounting connector assembly where the number of cores is 60.

The lower board 2 and the upper board 3 may be a rigid board such as a paper phenolic board or a glass epoxy board, or a flexible board, for example. In the state where the plug 5 is mated with the receptacle 4, the upper board 3 is parallel to the lower board 2.

Figure 3:
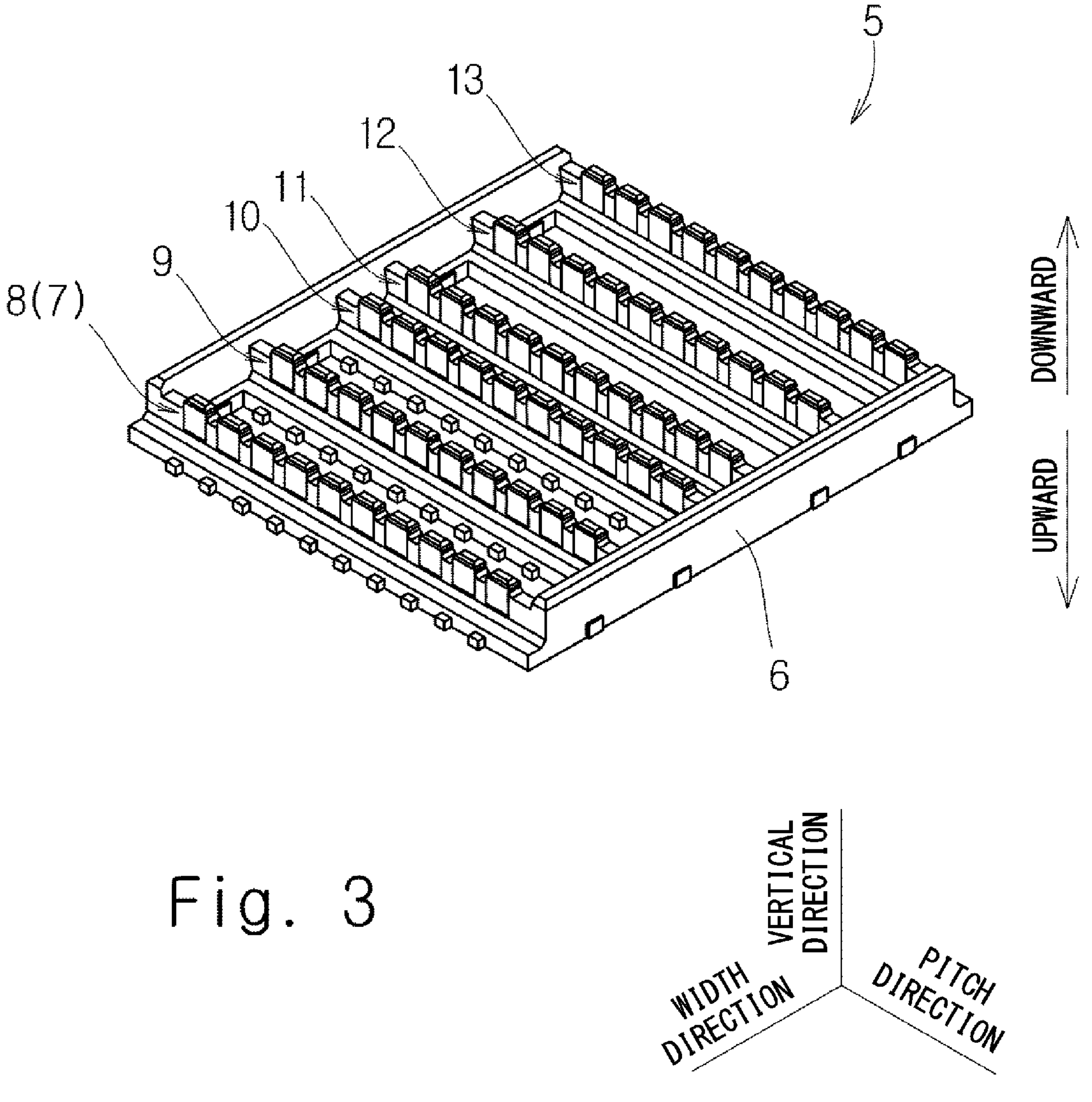
FIG. 3 is a perspective view of a plug connector (first embodiment)
Figure 5:
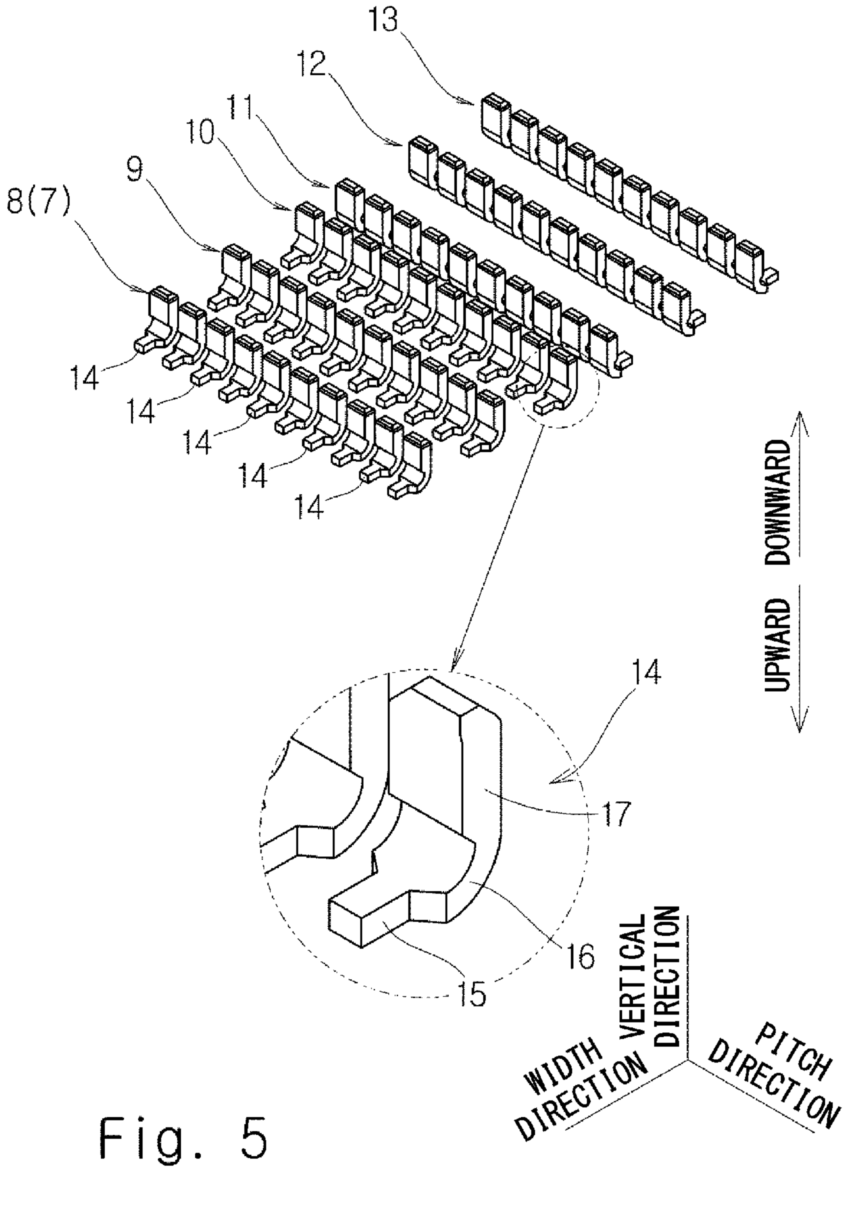
FIG. 5 is a perspective view of a plurality of plug contact arrays arranged in a width direction (first embodiment)

As shown in FIGS. 3 and 5, the plug 5 includes a plug housing 6 (housing) made of insulating resin and a plurality of plug contact arrays 7 (contact arrays) integrally formed with the plug housing 6 by insert molding. In this embodiment, the plurality of plug contact arrays 7 include six plug contact arrays 7. The six plug contact arrays 7 include a first plug contact array 8, a second plug contact array 9, a third plug contact array 10, a fourth plug contact array 11, a fifth plug contact array 12, and a sixth plug contact array 13. Note that, however, the number of plug contact arrays 7 that constitute the plug 5 is not limited as long as it is at least one. Typically, the plug 5 includes at least three plug contact arrays 7.

Figure 6:
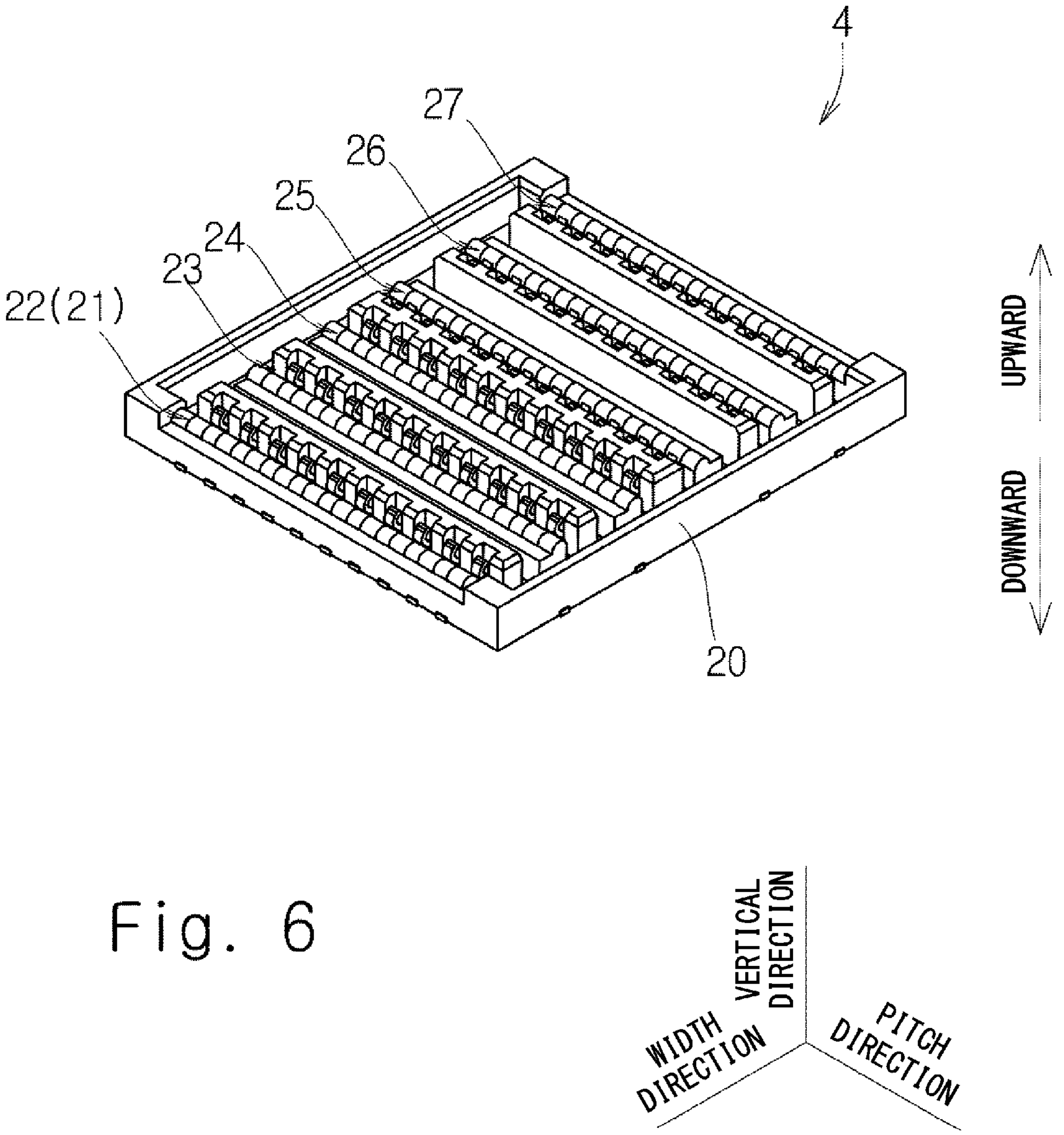
FIG. 6 is a perspective view of a receptacle connector (first embodiment)
Figure 7:
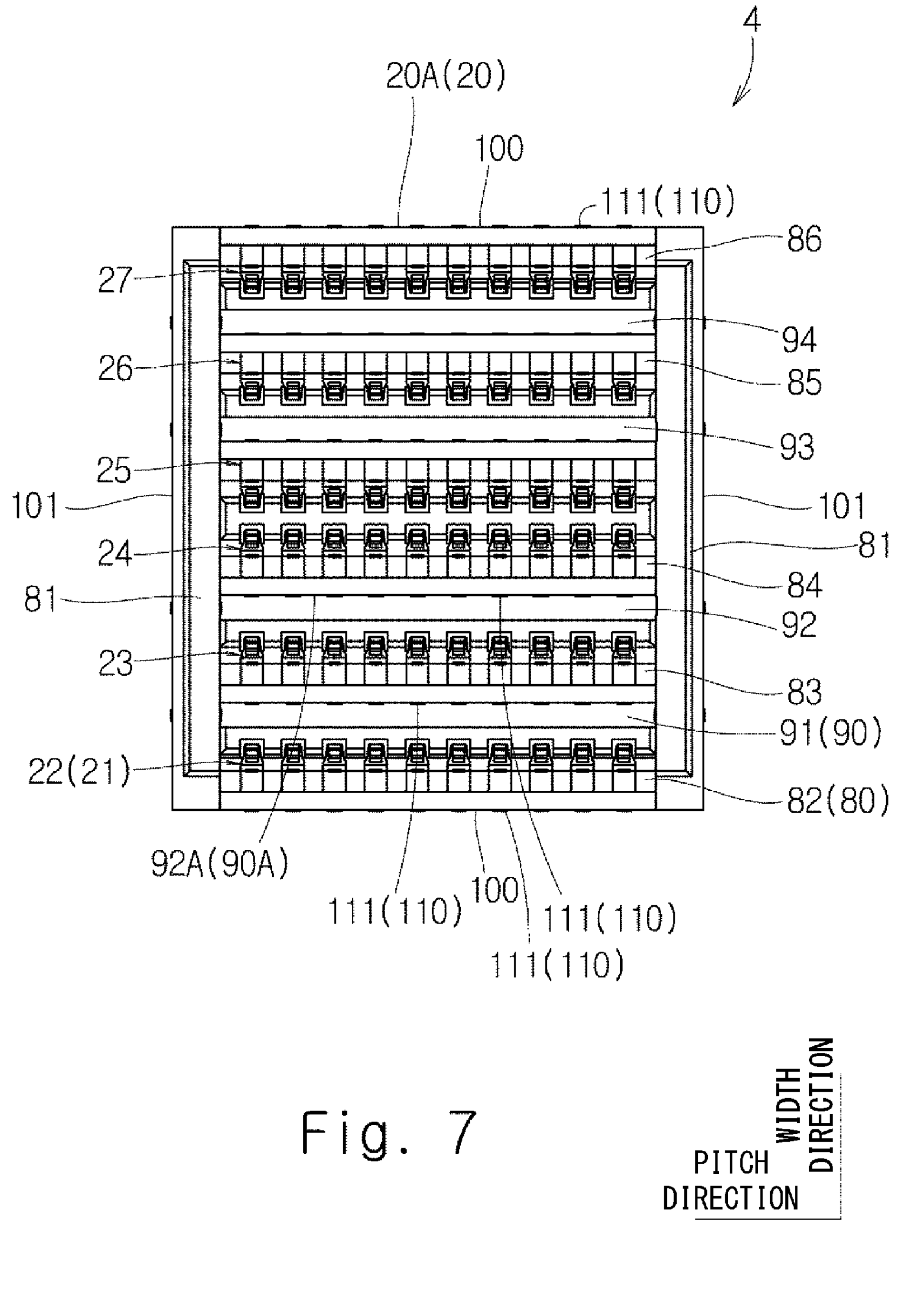
FIG. 7 is a plan view of the receptacle connector (first embodiment)
Figure 8:
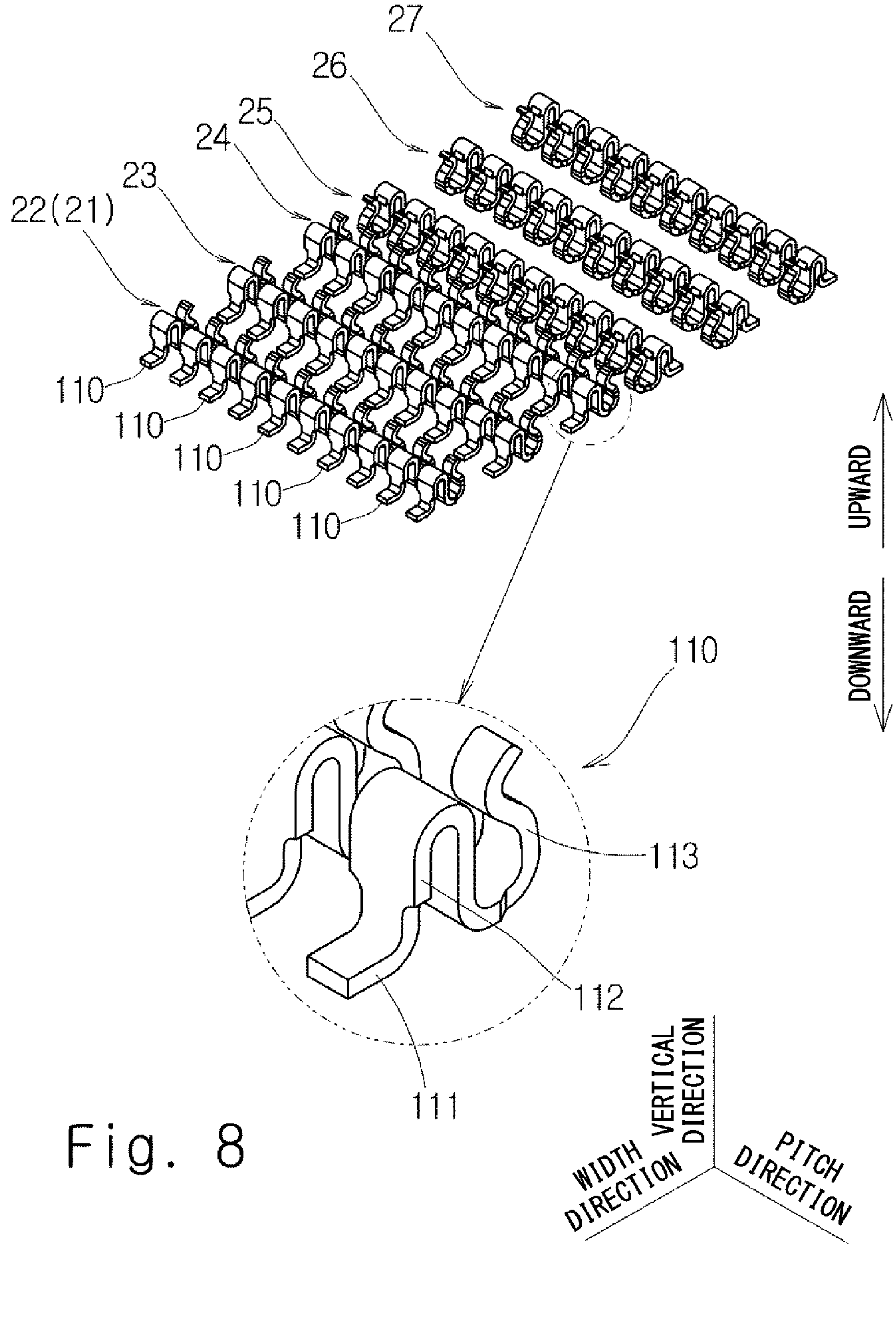
FIG. 8 is a perspective view of a plurality of receptacle contact arrays arranged in a width direction (first embodiment)

As shown in FIGS. 6 to 8, the receptacle 4 includes a receptacle housing 20 (housing) made of insulating resin and a plurality of receptacle contact arrays 21 (contact arrays) integrally formed with the receptacle housing 20 by insert molding. In this embodiment, the plurality of receptacle contact arrays 21 include six receptacle contact arrays 21. The six receptacle contact arrays 21 include a first receptacle contact array 22, a second receptacle contact array 23, a third receptacle contact array 24, a fourth receptacle contact array 25, a fifth receptacle contact array 26, and a sixth receptacle contact array 27. Note that, however, the number of receptacle contact arrays 21 that constitute the receptacle 4 is not limited as long as it is at least one. Typically, the receptacle 4 includes at least three receptacle contact arrays 21. The plurality of receptacle contact arrays 21 have the same shape.

In this embodiment, "connector" corresponds to the plug 5 and the receptacle 4. Likewise, "housing" corresponds to the plug housing 6 and the receptacle housing 20. "At least one contact array" corresponds to the second plug contact array 9, the third plug contact array 10, the fourth plug contact array 11, the fifth plug contact array 12, the second receptacle contact array 23, the third receptacle contact array 24, the fourth receptacle contact array 25, and the fifth receptacle contact array 26.

As shown in FIGS. 1 and 2, the first plug contact array 8, the second plug contact array 9, the third plug contact array 10, the fourth plug contact array 11, the fifth plug contact array 12, and the sixth plug contact array 13 correspond to the first receptacle contact array 22, the second receptacle contact array 23, the third receptacle contact array 24, the fourth receptacle contact array 25, the fifth receptacle contact array 26, and the sixth receptacle contact array 27, respectively. A pitch direction, a width direction, and a vertical direction are defined as below. The pitch direction, the width direction, and the vertical direction are orthogonal to each other.

Figure 4:
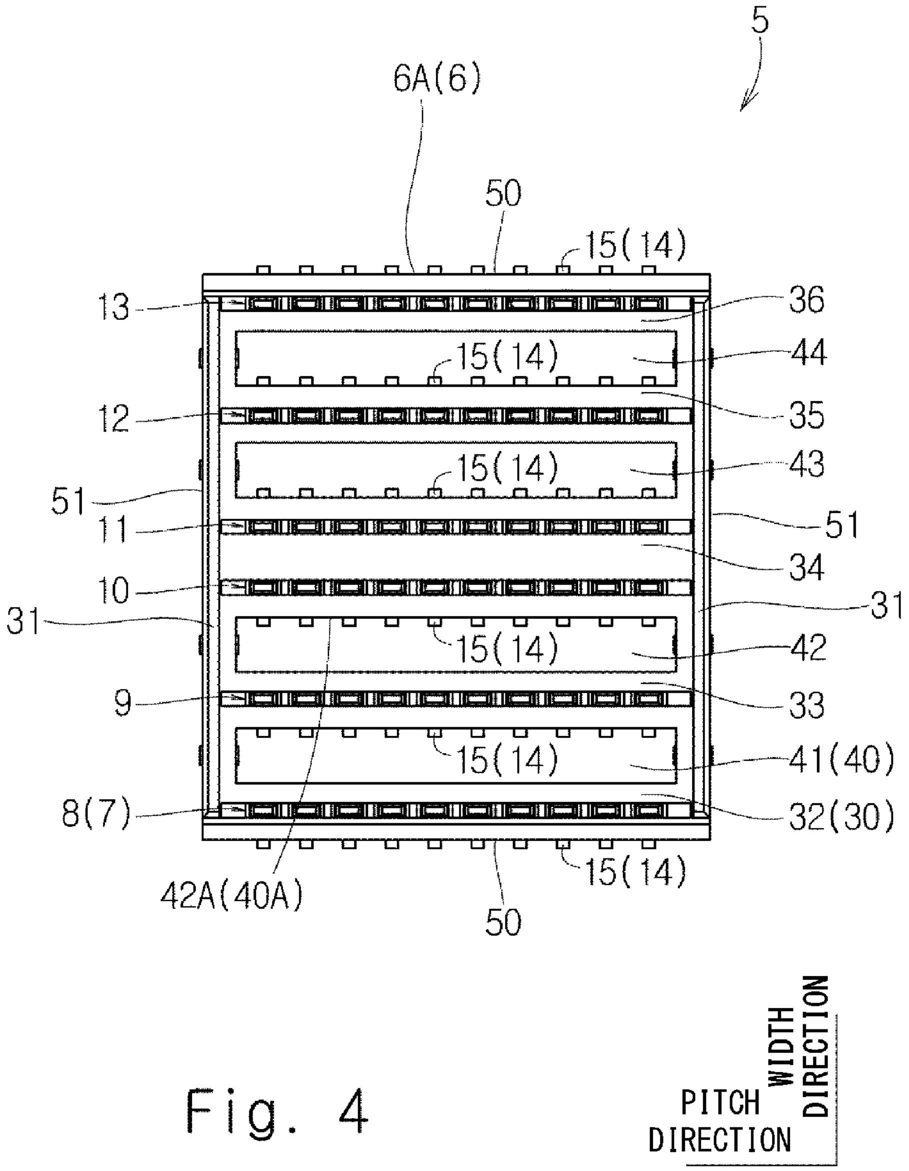
FIG. 4 is a plan view of the plug connector (first embodiment)

As shown in FIGS. 3 to 5, the pitch direction is defined as the longitudinal direction of the second plug contact array 9. Thus, the pitch direction corresponds to the row direction of the second plug contact array 9. Referring to FIG. 3, the pitch direction includes inward in the pitch direction toward the center of the plug 5 in the pitch direction, and outward in the pitch direction receding from the center of the plug 5 in the pitch direction.

As shown in FIG. 1, the vertical direction is orthogonal to the connector mounting surface 3A of the upper board 3. The vertical direction includes upward and downward. The upward direction is a direction in which the plug 5 moves relative to the receptacle 4 when removing the plug 5 from the receptacle 4. The downward direction is a direction in which the plug 5 moves relative to the receptacle 4 when mating the plug 5 with the receptacle 4. Thus, the vertical direction is the insertion and removal direction of the plug 5 to and from the receptacle 4.

Referring back to FIG. 3, the width direction is orthogonal to the pitch direction and the vertical direction as described above. The width direction includes inward in the width direction toward the center of the plug 5 in the width direction, and outward in the width direction receding from the center of the plug 5 in the width direction.

The above-described vertical direction is a direction defined by way of illustration only and should not be interpreted as limiting the position of the connector assembly 1 when actually used. Further, although each direction is defined using the structure of the plug 5 as described above, each direction is used also when describing the structure of the receptacle 4. For example, the pitch direction in the receptacle 4 coincides with the pitch direction of the plug 5 when the receptacle 4 is mated with the plug 5. Further, the width direction in the receptacle 4 coincides with the width direction of the plug 5 when the receptacle 4 is mated with the plug 5.

As shown in FIGS. 3 to 5, all of the plurality of plug contact arrays 7 extend in the pitch direction. Thus, the plurality of plug contact arrays 7 extend parallel to one another. The plurality of plug contact arrays 7 are arranged in the width direction. Further, the positions of the plurality of plug contact arrays 7 in the pitch direction are aligned.

Likewise, as shown in FIGS. 6 to 8, all of the plurality of receptacle contact arrays 21 extend in the pitch direction. Thus, the plurality of receptacle contact arrays 21 extend parallel to one another. The plurality of receptacle contact arrays 21 are arranged in the width direction. Further, the positions of the plurality of receptacle contact arrays 21 in the pitch direction are aligned.

Referring now to FIGS. 3, 5 and 9 to 12, the plug 5 is described hereinafter in detail. It should be noted that, when referring to FIGS. 3, 5, 9 and 10, the upward and downward orientations do not coincide with the upward and downward of the plane of paper. It should be also noted that FIG. 4 is a plan view of the plug 5, and the plan view of the plug 5 shown in FIG. 4 is a view when the plug 5 is observed from the receptacle 4 vertically opposed to the plug 5.

As shown in FIG. 4, the plug housing 6 includes a plurality of pitch beams and two width beams 31.

The plurality of pitch beams 30 extend in the pitch direction. The plurality of pitch beams 30 extend parallel to one another. The plurality of pitch beams 30 include a first pitch beam 32, a second pitch beam 33, a third pitch beam 34, a fourth pitch beam 35, and a fifth pitch beam 36.

The first pitch beam 32 holds the first plug contact array 8. The second pitch beam 33 holds the second plug contact array 9. The third pitch beam 34 holds the third plug contact array 10 and the fourth plug contact array 11. The fourth pitch beam 35 holds the fifth plug contact array 12. The fifth pitch beam 36 holds the sixth plug contact array 13.

The two width beams 31 extend in the width direction. The two width beams 31 extend parallel to each other. The two width beams 31 are disposed in such a way that the plurality of pitch beams 30 are interposed therebetween in the pitch direction. Thus, the plurality of pitch beams 30 extend from one to the other one of the two width beams 31.

A penetrating hole 40 (extension penetrating hole) that penetrates the plug housing 6 in the vertical direction is made between two pitch beams 30 adjacent to each other. Thus, the plug housing 6 has a plurality of penetrating holes 40. Each of the plurality of penetrating holes 40 extends from one to the other one of the two width beams 31. The plurality of penetrating holes 40 include a first penetrating hole 41, a second penetrating hole 42, a third penetrating hole 43, and a fourth penetrating hole 44. Each penetrating hole 40 has an inner peripheral surface 40A.

The first penetrating hole 41 is between the first pitch beam 32 and the second pitch beam 33. The second penetrating hole 42 is between the second pitch beam 33 and the third pitch beam 34. The third penetrating hole 43 is between the third pitch beam 34 and the fourth pitch beam 35. The fourth penetrating hole 44 is between the fourth pitch beam 35 and the fifth pitch beam 36.

An outer peripheral surface 6A of the plug housing 6 has a substantially square outline when viewed from above. The outer peripheral surface 6A of the plug housing 6 includes two width side surfaces 50 facing outward in the width direction and two pitch side surfaces 51 facing outward in the pitch direction. The two width side surfaces 50 are side surfaces located outermost in the width direction in the plug housing 6. The two pitch side surfaces 51 are side surfaces located outermost in the pitch direction in the plug housing 6.

The plug housing 6 is made up of one part. Specifically, the plug housing 6 is molded by one injection molding process in a single continuous cavity. The plug housing 6 is not formed by coupling a plurality of parts together. Thus, the plurality of pitch beams 30 are joined to each other in an unbroken manner. In one example, the second pitch beam 33 and the third pitch beam 34 are joined to each other in an unbroken manner through the two width beams 31.

As shown in FIG. 5, since the plurality of plug contact arrays 7 have the same shape, the shape of the third plug contact array 10 is described as a representative. The third plug contact array 10 includes a plurality of plug contacts 14 arranged at a predetermined pitch in the pitch direction.

Figure 9:
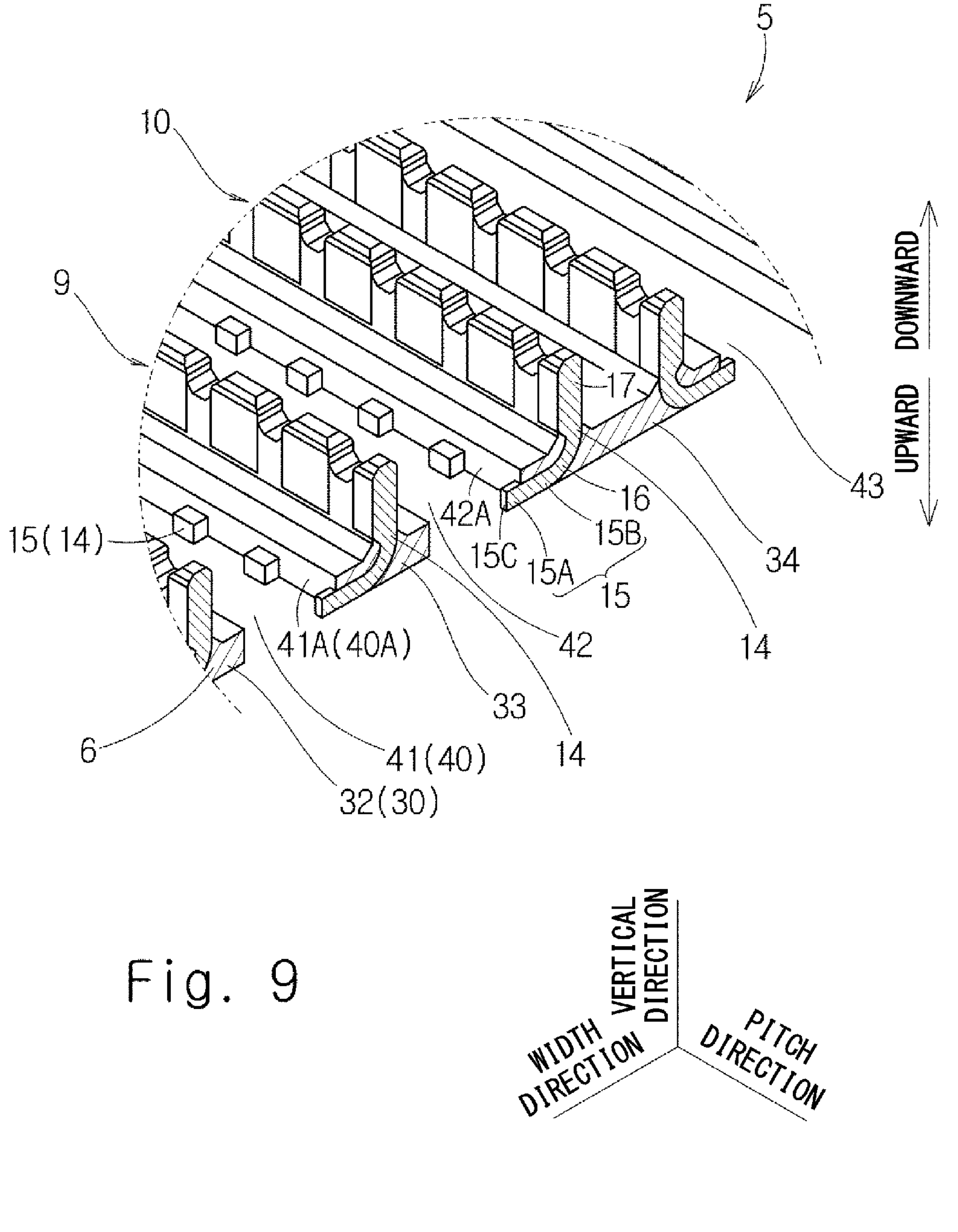
FIG. 9 is a cross-sectional perspective view of the plug connector (first embodiment)
Figure 10:
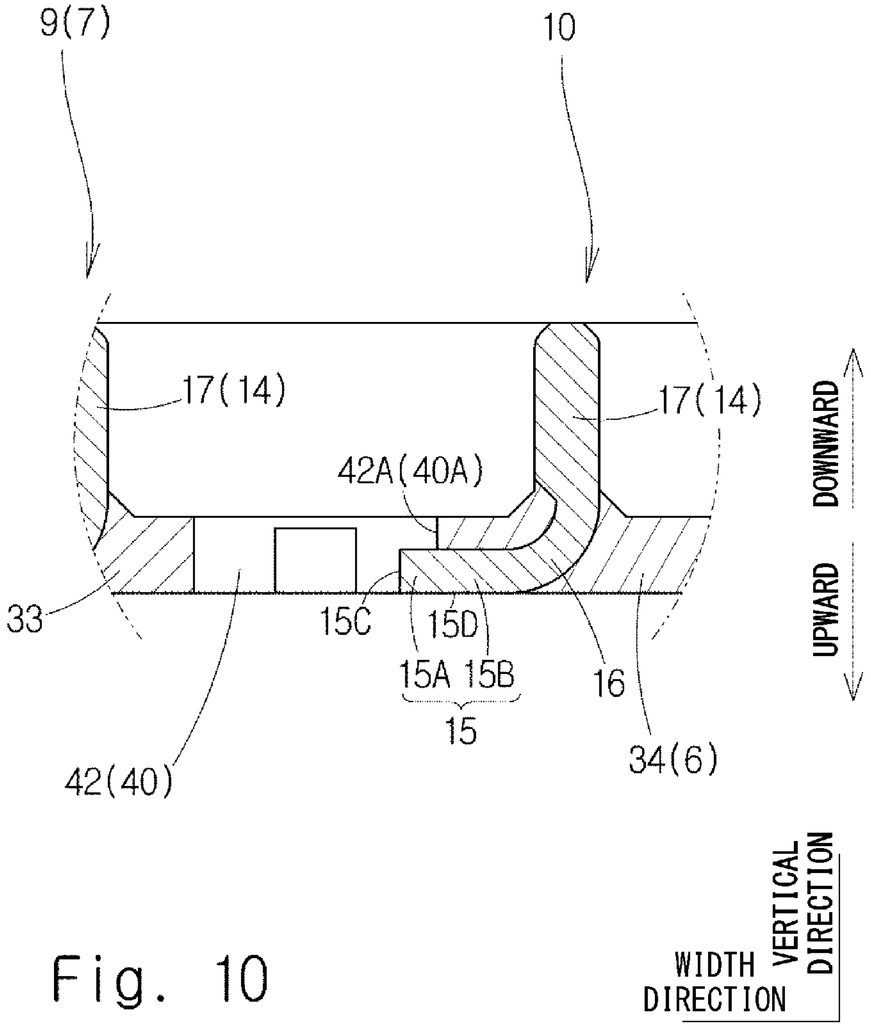
FIG. 10 is a cross-sectional view of the plug connector (first embodiment)

As shown in FIGS. 5, 9 and 10, each plug contact 14 is formed in an L-shape when viewed in the pitch direction, and it includes a soldering part 15, a buried part 16, and a contact part 17 in this recited order. Specifically, the soldering part 15 extending in the width direction and the contact part 17 extending in the vertical direction are coupled to each other through the buried part 16.

The soldering part 15 is a part to be soldered to an electrode pad, which is not shown, disposed on the connector mounting surface 3A of the upper board 3 in FIG. 1. As shown in FIGS. 9 and 10, the soldering part 15 includes a soldering exposed part 15A that projects outward in the width direction from the third pitch beam 34 and is thereby observable when viewed from above, and a soldering covered part 15B that is covered with the third pitch beam 34 and is thereby not observable when viewed from above. The soldering exposed part 15A is located inside the second penetrating hole 42. Thus, the soldering part 15 projects inside the second penetrating hole 42. A distal end surface 15C, which is a sectional surface facing outward in the width direction of the soldering part 15, is not flush with an inner peripheral surface 42A of the second penetrating hole 42. The distal end surface 15C is located outside the inner peripheral surface 42A of the second penetrating hole 42 in the width direction. Thus, the soldering part 15 extends to penetrate the inner peripheral surface 42A of the second penetrating hole 42. As shown in FIG. 10, the soldering part 15 has an exposed surface 15D that is exposed upward. Thus, the soldering exposed part 15A and the soldering covered part 15B are both exposed upward. Therefore, each of the soldering exposed part 15A and the soldering covered part 15B are both able to be soldered to a corresponding electrode pad disposed on the connector mounting surface 3A of the upper board 3.

As shown in FIGS. 9 and 10, the buried part 16 curves in an arc and thereby smoothly couples the soldering part 15 extending in the width direction and the contact part 17 extending in the vertical direction. The buried part 16 is buried in the plug housing 6. This prevents the contact part 17 from being soiled by solder or flux when soldering the soldering part 15.

The contact part 17 is a part that projects downward from the buried part 16, and it is exposed from the plug housing 6. The contact part 17 has high stiffness against bending, and is thereby not substantially elastically displaceable relative to the plug housing 6.

Although each plug contact 14 is formed in an L-shape in this embodiment, the shape of each plug contact 14 is not limited. For example, each plug contact 14 may have a straight shape with no bent part.

As shown in FIG. 4, the soldering part 15 of each plug contact 14 that constitutes the second plug contact array 9 projects inside the first penetrating hole 41. Likewise, the soldering part 15 of each plug contact 14 that constitutes the third plug contact array 10 projects inside the second penetrating hole 42. Likewise, the soldering part 15 of each plug contact 14 that constitutes the fourth plug contact array 11 projects inside the third penetrating hole 43. Likewise, the soldering part 15 of each plug contact 14 that constitutes the fifth plug contact array 12 projects inside the fourth penetrating hole 44.

On the other hand, the soldering part 15 of each plug contact 14 that constitutes the first plug contact array 8 projects outward in the width direction from one width side surface 50. Likewise, the soldering part 15 of each plug contact 14 that constitutes the sixth plug contact array 13 projects outward in the width direction from the other width side surface 50.

The plug housing 6 is additionally described hereinafter with reference to FIGS. 11 and 12.

Figure 11:
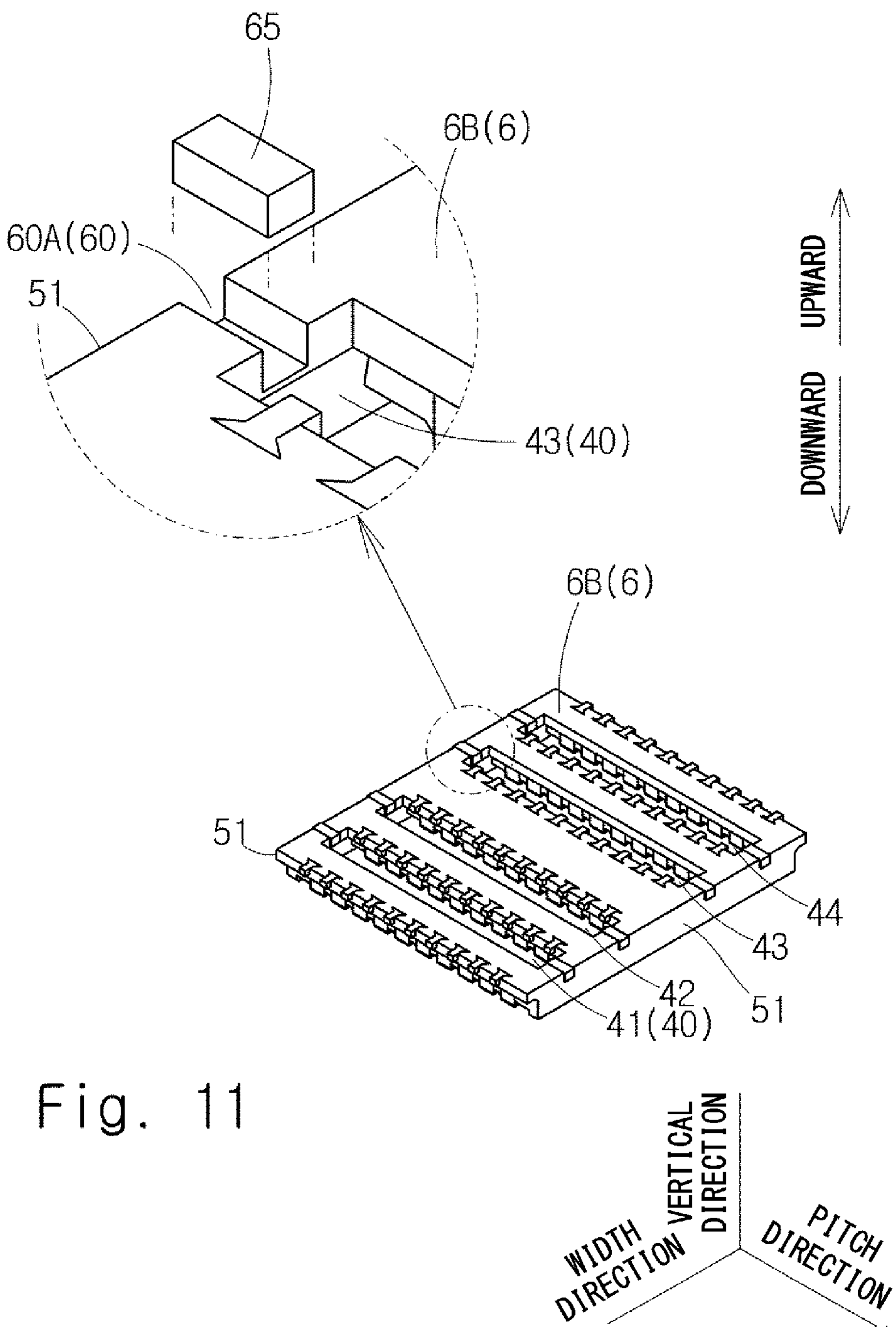
FIG. 11 is a perspective view of the plug connector (first embodiment)

As shown in FIG. 11, the plug housing 6 has a lower surface 6B facing upward. The lower surface 6B is a surface located uppermost in the plug housing 6. As shown in FIGS. 11 and 12, a plurality of pitch extension grooves 60 are formed on the lower surface 6B of the plug housing 6. The plurality of pitch extension grooves 60 extend in the pitch direction. The plurality of pitch extension grooves 60 extends from one to the other one of the two pitch side surfaces 51. The plurality of pitch extension grooves 60 are arranged in the width direction. The plurality of pitch extension grooves 60 include a first pitch extension groove 61, a second pitch extension groove 62, a third pitch extension groove 63, and a fourth pitch extension groove 64.

In this embodiment, the plurality of pitch extension grooves 60 extend to respectively intersect with the plurality of penetrating holes 40 when viewed from below. Specifically, the first pitch extension groove 61 extends to intersect with the first penetrating hole 41. The second pitch extension groove 62 extends to intersect with the second penetrating hole 42. The third pitch extension groove 63 extends to intersect with the third penetrating hole 43. The fourth pitch extension groove 64 extends to intersect with the fourth penetrating hole 44. Thus, each pitch extension groove 60 is divided by the corresponding penetrating hole 40 in the pitch direction. By being divided, a part of each pitch extension groove 60 that overlaps the corresponding penetrating hole 40 is lost, and thereby each pitch extension groove 60 is made up of two pitch extension divided grooves 60A between which the corresponding penetrating hole 40 is interposed in the pitch direction.

As shown in FIG. 11, a metal piece 65 made of the same material as the plug contact 14 is accommodated in each pitch extension divided groove 60A. The metal piece 65 may be omitted.

Figure 13:
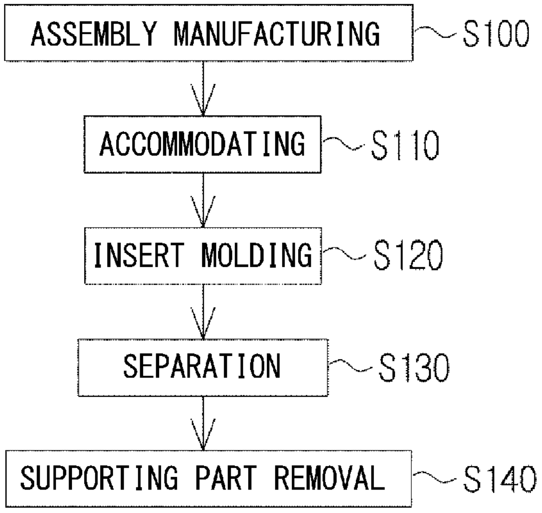
FIG. 13 is a manufacturing flow of the plug connector (first embodiment)
Figure 14:
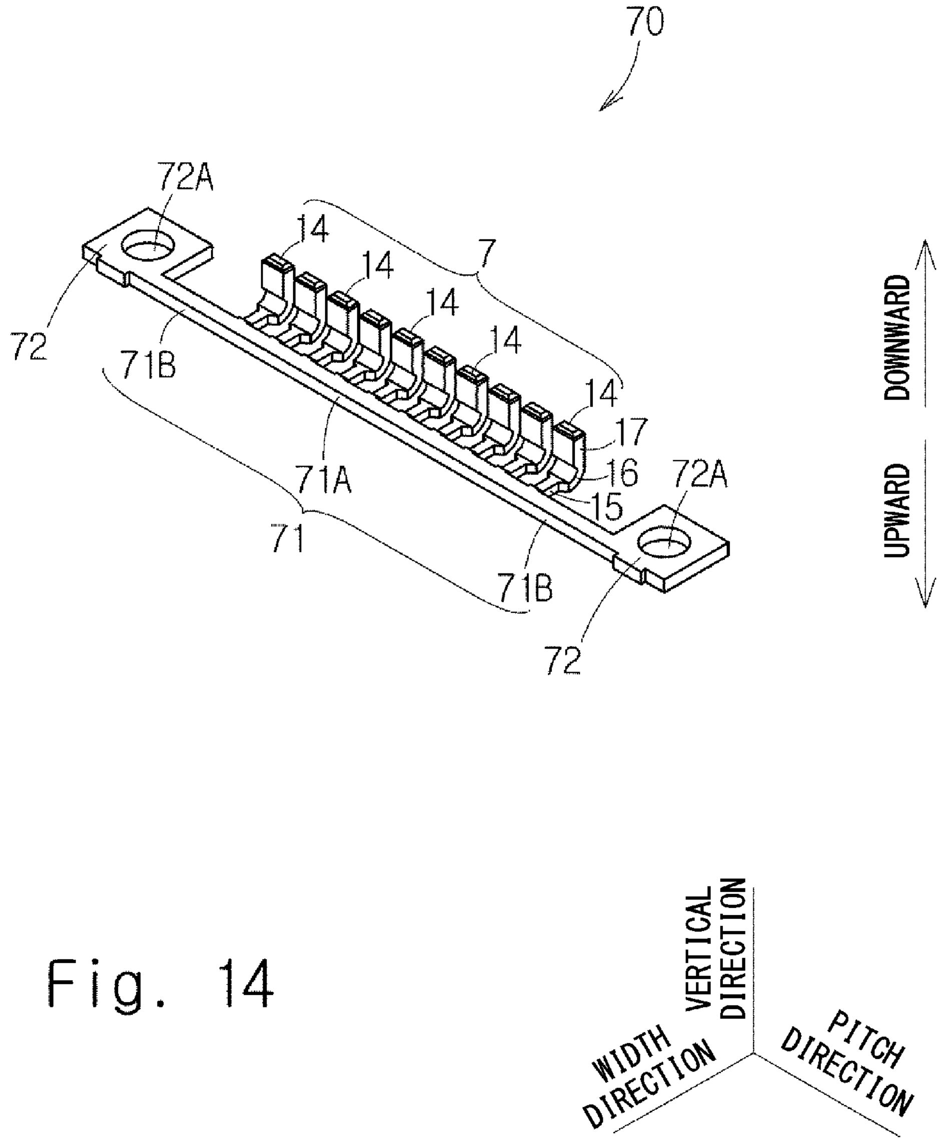
FIG. 14 is a perspective view of a plug contact assembly (first embodiment)

A method of manufacturing the plug 5 is described hereinafter with reference to FIGS. 13 to 19. FIG. 13 shows a manufacturing flow of the plug 5. As shown in FIG. 13, the manufacturing method of the plug 5 includes an assembly manufacturing step (S100), an accommodating step (S110), an insert molding step (S120), a separation step (S130), and a supporting part removal step (S140). Assembly Manufacturing Step (S100):

As shown in FIG. 14, in the assembly manufacturing step, a plug contact assembly 70 (contact assembly) is manufactured. Each plug contact assembly 70 includes the plug contact array 7, a coupling beam 71 that couples the plurality of plug contacts 14 of the plug contact array 7 with each other, and two supporting parts 72 between which the coupling beam 71 is interposed in the pitch direction.

The coupling beam 71 includes a coupling beam body 71A opposed to the plug contact array 7 in the width direction and two connection parts 71B projecting outward in the pitch direction from both ends of the coupling beam body 71A. The coupling beam body 71A of the coupling beam 71 connects to the soldering part 15 of each plug contact 14. Thus, each plug contact 14, sequentially having the soldering part 15, the buried part 16 and the contact part 17 in this order, projects from the coupling beam body 71A of the coupling beam 71.

Each supporting part 72 is disposed to be opposed to the plug contact array 7 in the pitch direction. The thickness direction of each supporting part 72 coincides with the vertical direction. Each supporting part 72 has a positioning hole 72A in a circular shape.

The plug contact assembly 70 having the above-described structure is formed typically by pressing a thin metal plate.

In this embodiment, since the plug 5 requires six plug contact arrays 7, six plug contact assemblies 70 are manufactured when manufacturing one plug 5. The six plug contact assemblies 70 are manufactured as separate parts. In this embodiment, the plurality of plug contact assemblies 70 have the same shape. Alternatively, the plurality of plug contact assemblies 70 may have different shapes.

Figure 15:
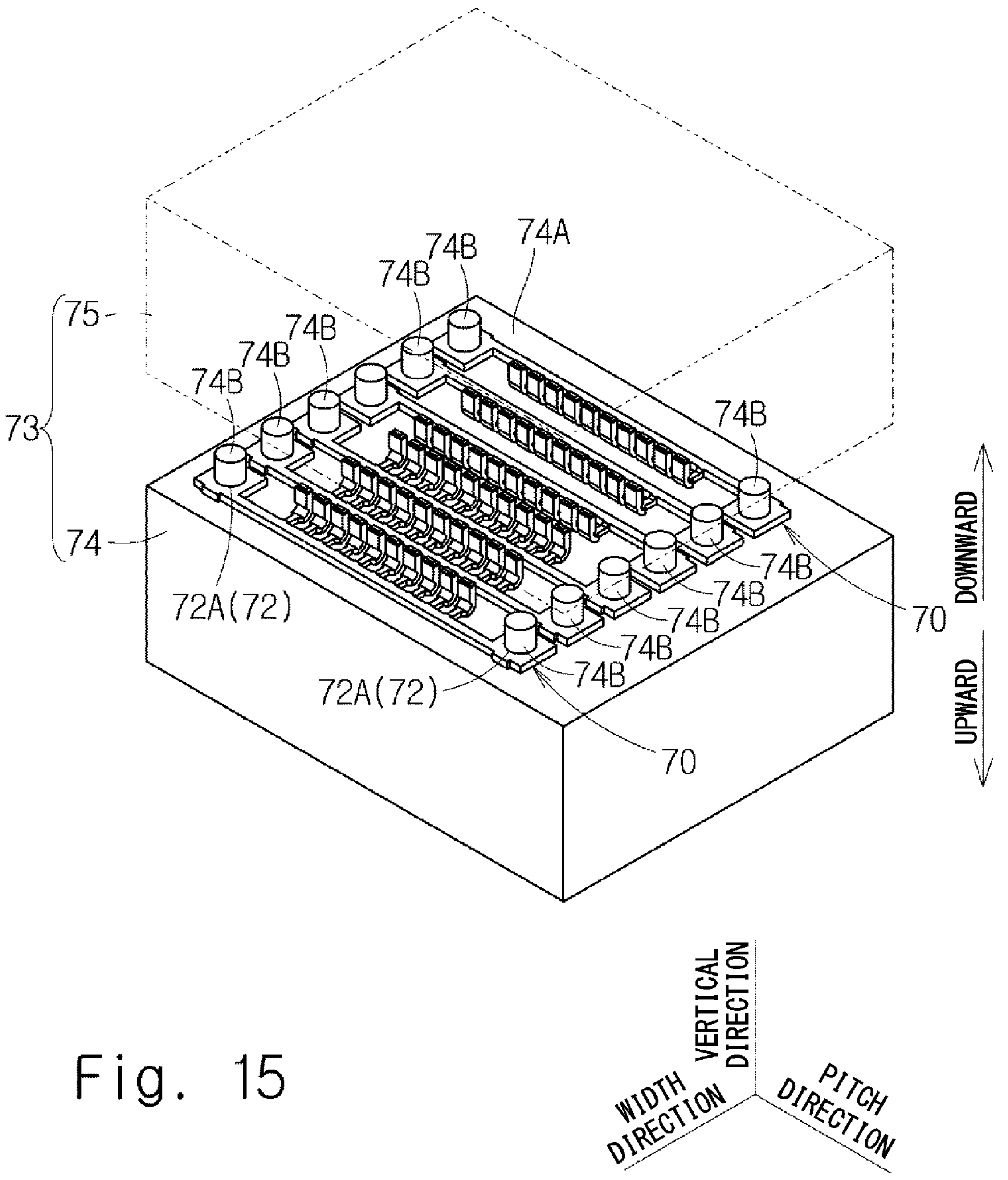
FIG. 15 is a perspective view of an injection mold where a plurality of plug contact assemblies are set (first embodiment)

Accommodating Step (S110):

FIGS. 15 and 16 show an injection mold 73 for injection molding of the plug housing 6. The injection mold 73 includes a stationary plate 74 and a movable plate 75. The movable plate 75 is vertically movable relative to the stationary plate 74. As shown in FIG. 15, when accommodating the plurality of plug contact assemblies 70 into the injection mold 73, in the state where the injection mold 73 opens, the plurality of plug contact assemblies 70 are set to a division surface 74A of the stationary plate 74 by using a plurality of positioning pins 74B projecting upward from the division surface 74A of the stationary plate 74. At this moment, each positioning pin 74B is inserted into each positioning hole 72A of each plug contact assembly 70, so that each plug contact assembly 70 is in position with respect to the stationary plate 74 in the pitch direction and the width direction. Since the two positioning pins 74B are respectively inserted into the two positioning holes 72A for positioning of one plug contact assembly 70, the plug contact assembly 70 is inhibited from horizontally rotating in the state where the plug contact assembly 70 is set to the division surface 74A of the stationary plate 74. Further, since the two positioning holes 72A are formed as far as possible from each other in the pitch direction, highly accurate positioning of each plug contact assembly 70 with respect to the stationary plate 74 is achieved.

Further, as shown in FIG. 15, the plurality of plug contact assemblies 70 are manufactured separately. Thus, as shown in FIG. 15, the plurality of plug contact assemblies 70 can be disposed closer to one another in the width direction, which contributes to reducing the size of the plug 5 in the width direction. If the plurality of plug contact assemblies 70 are manufactured in the state where they are coupled to one another and then insert molding is performed with this coupled state, the contact part 17 of the plug contact 14 of the two plug contact assemblies 70 adjacent to each other in the width direction need to be extremely short. This is because the contact part 17 of each plug contact 14 of one plug contact assembly 70 of two plug contact assemblies 70 adjacent to each other in the width direction overlaps the coupling beam 71 of the other plug contact assembly 70 in the development view of the two plug contact assemblies 70 adjacent to each other in the width direction.

Next, as shown in FIG. 16, the injection mold 73 is clamped. At this moment, the plug contact assembly 70 is supported at both ends in the injection mold 73 by using the two supporting parts 72 of the plug contact assembly 70. To be specific, the two supporting parts 72 are sandwiched between the stationary plate 74 and the movable plate 75 in the vertical direction, and thereby the plug contact assembly 70 is supported at both ends in the injection mold 73.

Insert Molding Step (S120):

After that, molten resin is fed to a cavity of the injection mold 73. Then, the plug housing 6 is molded integrally with the plurality of plug contact assemblies 70 by insert molding. The plug housing 6 is molded by one insert molding process. The plug housing 6 is molded in a single cavity. The plug housing 6 is molded as one part.

Figure 18:
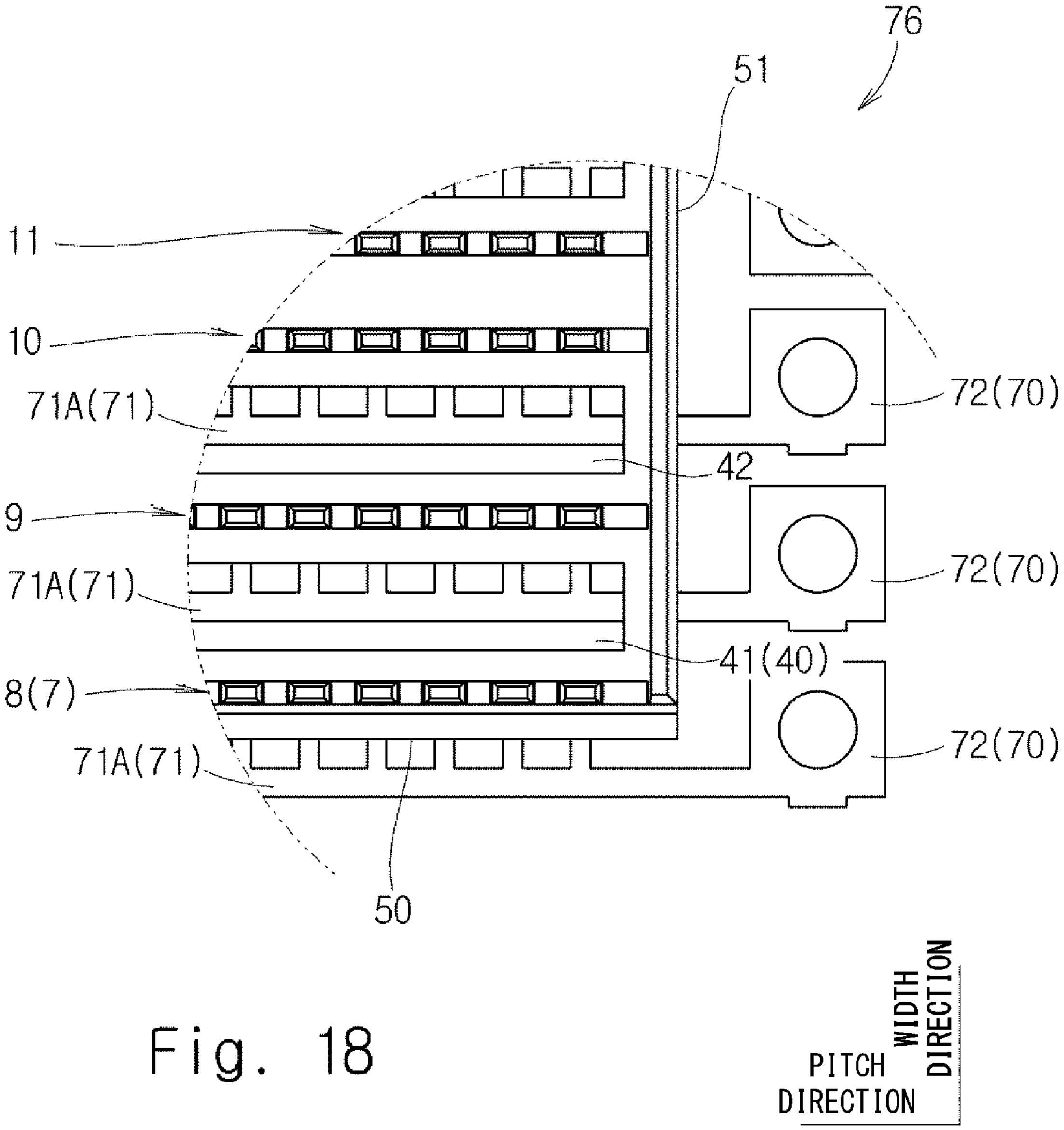
FIG. 18 is a plan view of the molded product (first embodiment)

FIGS. 17 and 18 show a molded product 76 retrieved from the injection mold 73. As shown in FIGS. 17 and 18, in the insert molding step, the plug housing 6 is molded in such a way that the two supporting parts 72 of each plug contact assembly 70 are exposed outside the two pitch side surfaces 51 of the plug housing 6 in the pitch direction.

Further, as shown in FIG. 18, in the insert molding step, the plug housing 6 is molded in such a way that the coupling beam bodies 71A of the coupling beams 71 of the plug contact assemblies 70 corresponding to the second plug contact array 9, the third plug contact array 10, the fourth plug contact array 11 and the fifth plug contact array 12 are between the two width side surfaces 50 of the plug housing 6 and separated from the two width side surfaces 50.

Further, in the insert molding step, the plug housing 6 is molded in such a way that the coupling beam bodies 71A of the coupling beams 71 of the plug contact assemblies 70 corresponding to the second plug contact array 9, the third plug contact array 10, the fourth plug contact array 11 and the fifth plug contact array 12 are vertically exposed in the first penetrating hole 41, the second penetrating hole 42, the third penetrating hole 43 and the fourth penetrating hole 44, respectively. In other words, the plug housing 6 is molded to have the first penetrating hole 41, the second penetrating hole 42, the third penetrating hole 43 and the fourth penetrating hole 44 that penetrate the plug housing 6 in the vertical direction in such a way that the coupling beam bodies 71A of the coupling beams 71 of the plug contact assemblies 70 corresponding to the second plug contact array 9, the third plug contact array 10, the fourth plug contact array 11 and the fifth plug contact array 12 are vertically exposed. On the other hand, the plug housing 6 is molded in such a way that the coupling beams 71 of each plug contact assemblies 70 corresponding to the first plug contact array 8 and the sixth plug contact array 13 are located outside the corresponding width side surface 50 in the width direction.

Separation Step (S130)

Then, the plurality of plug contacts 14 are disjointed by removing at least part of each plug contact assembly 70 by cutting.

Specifically, in the plug contact assemblies 70 corresponding to the second plug contact array 9, the third plug contact array 10, the fourth plug contact array 11 and the fifth plug contact array 12, as shown in FIG. 19, a part of each plug contact assembly 70 that is vertically exposed in each penetrating hole 40 is removed by cutting. In FIG. 19, an area to be removed is indicated by hatching. In the example of FIG. 19, the coupling beam body 71A of the coupling beam 71 of each plug contact assembly 70 is removed by cutting. On the other hand, in the plug contact assemblies 70 corresponding to the first plug contact array 8 and the sixth plug contact array 13, the coupling beam 71 is exposed as a whole, and therefore the entire coupling beam 71 is removed by cutting.

Supporting Part Removal Step (S140)

After that, the two supporting parts 72 of each plug contact assembly 70 are removed by cutting.

Specifically, in the plug contact assemblies 70 corresponding to the second plug contact array 9, the third plug contact array 10, the fourth plug contact array 11 and the fifth plug contact array 12, as shown in FIG. 19, the two supporting parts 72 of each plug contact assembly 70 and a part of the two connection parts 71B projecting outward in the pitch direction from the two pitch side surfaces 51 of the plug housing 6 are removed by cutting.

On the other hand, in the plug contact assemblies 70 corresponding to the first plug contact array 8 and the sixth plug contact array 13, the coupling beam 71 is exposed as a whole, and therefore the two supporting parts 72 and the coupling beam 71 are removed by cutting.

Note that the separation step and the supporting part removal step are typically performed simultaneously. Further, the supporting part removal step may be omitted, and the two supporting parts 72 of each plug contact assembly 70 may be left without being removed.

In this manner, as shown in FIG. 9, the soldering part 15 of each plug contact 14 projects inside the corresponding penetrating hole 40. Further, as shown in FIGS. 11 and 12, the plurality of pitch extension grooves 60 respectively corresponding to the coupling beams 71 of the plurality of plug contact assemblies 70 are formed on the lower surface 6B of the plug housing 6. Then, as shown in FIG. 11, an unremoved part of the two connection parts 71B of the coupling beam 71 remains as the metal piece 65 in the two pitch extension divided grooves 60A of the pitch extension groove 60. Note that, however, in order to reduce the weight of the plug 5, the metal piece 65 may drop off from the pitch extension divided grooves 60A. For example, if the plug housing 6 is molded in such a way that the plug housing 6 does not directly touch the metal piece 65 by covering the connection parts 71B of the coupling beams 71 shown in FIG. 14 with a slide core that is slidable in the pitch direction during insert molding, the metal piece 65 is integrated with the corresponding supporting part 72 and thereby easily removable without cutting each plug contact assembly 70 in the supporting part removal step.

Next, the receptacle 4 is described in detail with reference to FIGS. 6 to 8 and 20 to 22. Since the receptacle 4 is similar to the structure of the plug 5 in many points, the same description as that of the plug 5 is omitted as appropriate.

As shown in FIG. 7, the receptacle housing 20 includes a plurality of pitch beams 80 and two width beams 81.

The plurality of pitch beams 80 extend in the pitch direction. The plurality of pitch beams 80 extend parallel to one another. The plurality of pitch beams 80 include a first pitch beam 82, a second pitch beam 83, a third pitch beam 84, a fourth pitch beam 85, and a fifth pitch beam 86.

The first pitch beam 82 holds the first receptacle contact array 22. The second pitch beam 83 holds the second receptacle contact array 23. The third pitch beam 84 holds the third receptacle contact array 24 and the fourth receptacle contact array 25. The fourth pitch beam 85 holds the fifth receptacle contact array 26. The fifth pitch beam 86 holds the sixth receptacle contact array 27.

The two width beams 81 extend in the width direction. The two width beams 81 extend parallel to each other. The two width beams 81 are disposed in such a way that the plurality of pitch beams 80 are interposed therebetween in the pitch direction. Thus, the plurality of pitch beams 80 extend from one to the other one of the two width beams 81.

A penetrating hole 90 (extension penetrating hole) that penetrates the receptacle housing 20 in the vertical direction is made between two pitch beams 80 adjacent to each other. Thus, the receptacle housing 20 has a plurality of penetrating holes 90. Each of the plurality of penetrating holes 90 extends from one to the other one of the two width beams 81. The plurality of penetrating holes 90 include a first penetrating hole 91, a second penetrating hole 92, a third penetrating hole 93, and a fourth penetrating hole 94. Each penetrating hole 90 has an inner peripheral surface 90A.

The first penetrating hole 91 is between the first pitch beam 82 and the second pitch beam 83. The second penetrating hole 92 is between the second pitch beam 83 and the third pitch beam 84. The third penetrating hole 93 is between the third pitch beam 84 and the fourth pitch beam 85. The fourth penetrating hole 94 is between the fourth pitch beam 85 and the fifth pitch beam 86.

As shown in FIG. 4, an outer peripheral surface 20A of the receptacle housing 20 has a substantially square outline when viewed from above. The outer peripheral surface 20A of the receptacle housing 20 includes two width side surfaces 100 facing outward in the width direction and two pitch side surfaces 101 facing outward in the pitch direction. The two width side surfaces 100 are side surfaces located outermost in the width direction in the receptacle housing 20. The two pitch side surfaces 101 are side surfaces located outermost in the pitch direction in the receptacle housing 20.

The receptacle housing 20 is made up of one part. Specifically, the receptacle housing 20 is molded by one injection molding process in a single continuous cavity. The receptacle housing 20 is not formed by coupling a plurality of parts together. Thus, the plurality of pitch beams 80 are joined to each other in an unbroken manner. In one example, the second pitch beam 83 and the third pitch beam 84 are joined to each other in an unbroken manner through the two width beams 81.

As shown in FIG. 8, since the plurality of receptacle contact arrays 21 have the same shape, the shape of the third receptacle contact array 24 is described as a representative. The third receptacle contact array 24 includes a plurality of receptacle contacts 110 arranged at a predetermined pitch in the pitch direction.

Figure 20:
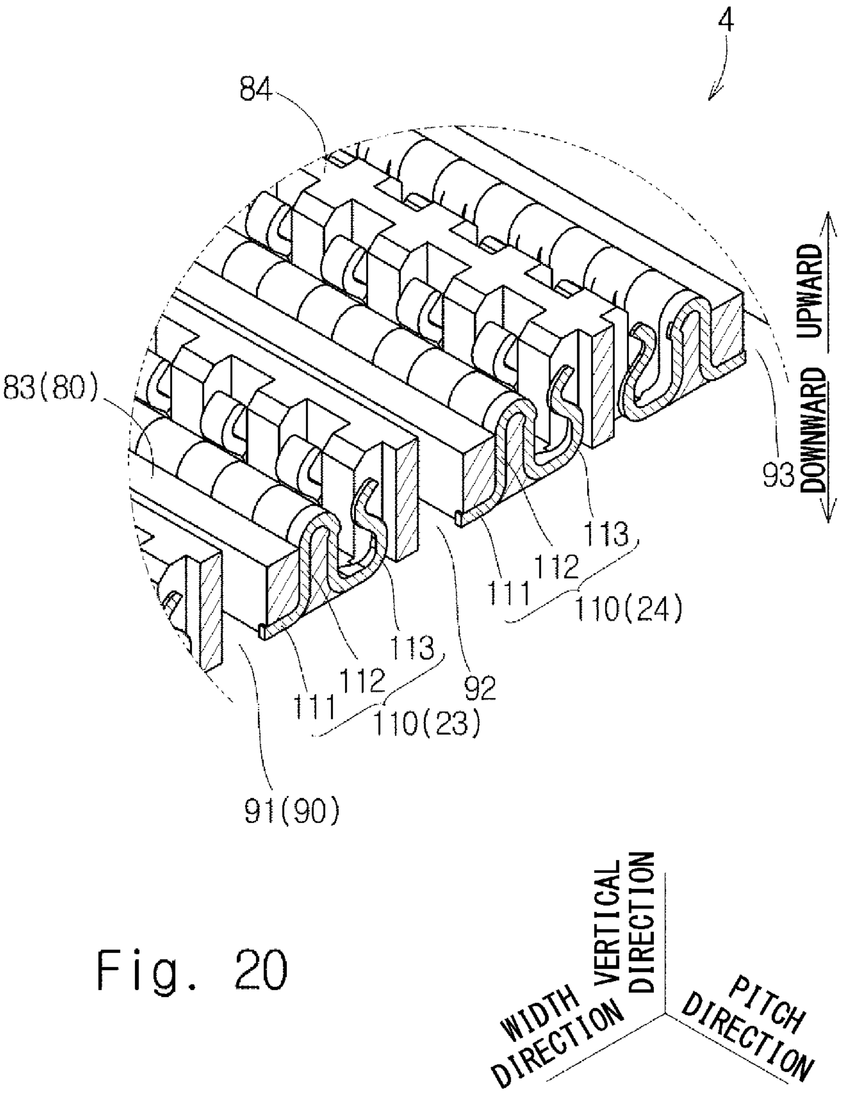
FIG. 20 is a cross-sectional perspective view of the receptacle connector (first embodiment)
Figure 21:
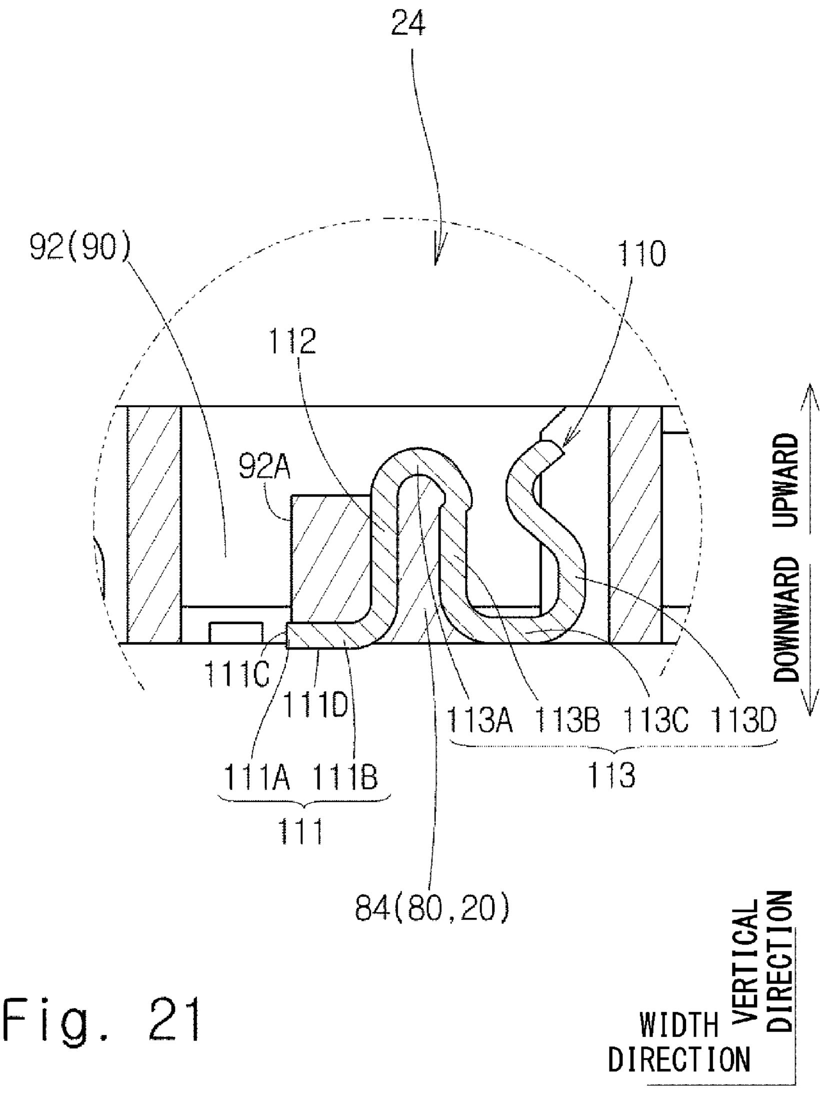
FIG. 21 is a cross-sectional view of the receptacle connector (first embodiment)

As shown in FIGS. 8, 20 and 21, the receptacle contact 110 includes a soldering part 111, a buried part 112, and a contact part 113 in this recited order. Specifically, the soldering part 111 and the contact part 113 are coupled to each other through the buried part 112.

The soldering part 111 is a part to be soldered to an electrode pad, which is not shown, disposed on the connector mounting surface 2A of the lower board 2 in FIG. 1. As shown in FIG. 21, the soldering part 111 includes a soldering exposed part 111A that projects in the width direction from the third pitch beam 84 and is thereby observable when viewed from above, and a soldering covered part 111B that is covered with the third pitch beam 34 and is thereby not observable when viewed from above. The soldering exposed part 111A is located inside the second penetrating hole 92. Thus, the soldering part 111 projects inside the second penetrating hole 92. A distal end surface 111C, which is a sectional surface facing outward in the width direction of the soldering part 111, is not flush with an inner peripheral surface 92A of the second penetrating hole 92. The distal end surface 111C is located outside the inner peripheral surface 92A of the second penetrating hole 92 in the width direction. Thus, the soldering part 111 extends to penetrate the inner peripheral surface 92A of the second penetrating hole 92. The soldering part 111 has an exposed surface 111D that is exposed downward. Thus, the soldering exposed part 111A and the soldering covered part 111B are both exposed downward. Therefore, the soldering exposed part 111A and the soldering covered part 111B are both able to be soldered to corresponding electrode pads disposed on the connector mounting surface 2A of the lower board 2.

The buried part 112 extends upward from the soldering part 111. The buried part 112 couples the soldering part 111 and the contact part 113. The buried part 112 is buried in the receptacle housing 20. This prevents the contact part 113 from being soiled by solder or flux when soldering the soldering part 111.

The contact part 113 is elastically deformable in the width direction so as to come into electrical contact with the contact part 17 of the corresponding plug contact 14 of the plug 5. The contact part 113 includes a curved part 113A, a downward part 113B, a horizontal part 113C, and an S-shaped part 113D in this recited order.

The curved part 113A projects inward in the width direction from the upper end of the buried part 112 and is curved to be convex upward.

The downward part 113B projects downward from the curved part 113A.

The horizontal part 113C projects inward in the width direction from the downward part 113B.

The S-shaped part 113D projects upward in an S-shape from the horizontal part 113C when viewed in the pitch direction. The S-shaped part 113D is opposed to the downward part 113B in the width direction.

The contact part 113 is supported like a cantilever beam by the buried part 112 and thereby elastically deformable in the width direction. To be specific, the S-shaped part 113D of the contact part 113 is elastically deformable in the width direction.

Then, when the contact part 17 of the plug contact 14 shown in FIG. 10 is inserted between the downward part 113B and the S-shaped part 113D of the contact part 113 of the corresponding receptacle contact 110 shown in FIG. 21, the S-shaped part 113D is slightly elastically deformed inward in the width direction, and the S-shaped part 113D comes into contact with the contact part 17 of the plug contact 14 at a predetermined contact pressure.

As described above, in this embodiment, each receptacle contact 110 includes the contact part 113 that is elastically deformable in the width direction. Alternatively, the contact part 113 may be elastically deformable in the vertical direction.

As shown in FIG. 7, the soldering part 111 of each receptacle contact 110 that constitutes the second receptacle contact array 23 projects inside the first penetrating hole 91. Likewise, the soldering part 111 of each receptacle contact 110 that constitutes the third receptacle contact array 24 projects inside the second penetrating hole 92. Likewise, the soldering part 111 of each receptacle contact 110 that constitutes the fourth receptacle contact array 25 projects inside the third penetrating hole 93. Likewise, the soldering part 111 of each receptacle contact 110 that constitutes the fifth receptacle contact array 26 projects inside the fourth penetrating hole 94.

On the other hand, the soldering part 111 of each receptacle contact 110 that constitutes the first receptacle contact array 22 projects outward in the width direction from one width side surface 100. Likewise, the soldering part 111 of each receptacle contact 110 that constitutes the sixth receptacle contact array 27 projects outward in the width direction from the other width side surface 100.

The other structure of the receptacle 4 is the same as that of the plug 5.

A method of manufacturing the receptacle 4 is described hereinafter. The manufacturing method of the receptacle 4 includes an assembly manufacturing step (S100), an accommodating step (S110), an insert molding step (S120), a separation step (S130), and a supporting part removal step (S140), just like the manufacturing method of the plug 5.

Figure 22:
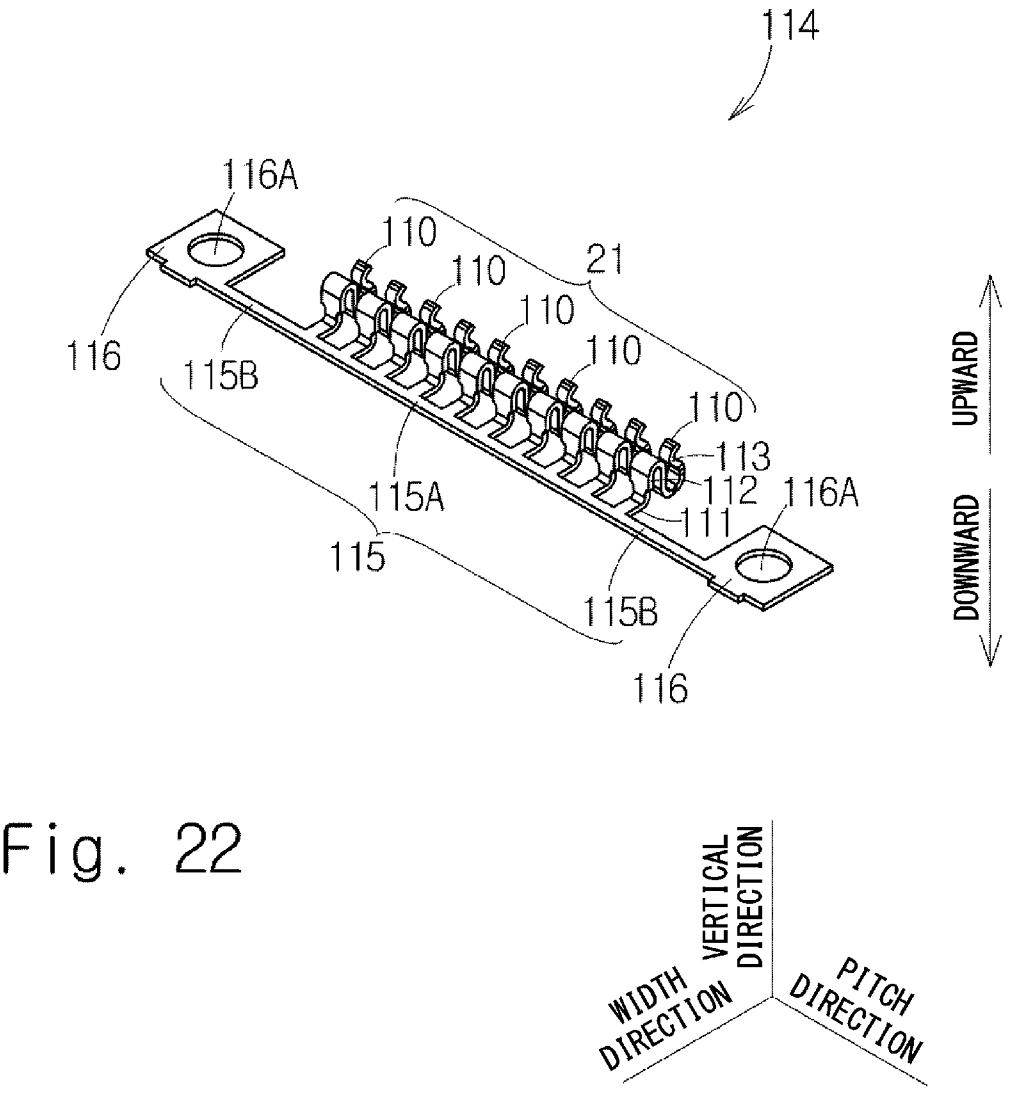
FIG. 22 is a perspective view of the receptacle contact assembly (first embodiment)

Assembly Manufacturing Step (S100):

As shown in FIG. 22, in the assembly manufacturing step, a receptacle contact assembly 114 (contact assembly) is manufactured. Each receptacle contact assembly 114 includes the receptacle contact array 21, a coupling beam 115 that couples the plurality of receptacle contacts 110 of the receptacle contact array 21 with one another, and two supporting parts 116 between which the coupling beam 115 is interposed in the pitch direction.

The coupling beam 115 includes a coupling beam body 115A opposed to the receptacle contact array 21 in the width direction and two connection parts 115B projecting outward in the pitch direction from both ends of the coupling beam body 115A. The coupling beam body 115A of the coupling beam 115 connects to the soldering part 111 of each receptacle contact 110. Thus, each receptacle contact 110, sequentially having the soldering part 111, the buried part 112 and the contact part 113 in this order, projects from the coupling beam body 115A of the coupling beam 115.

Each supporting part 116 is disposed to be opposed to the receptacle contact array 21 in the pitch direction. The thickness direction of each supporting part 116 coincides with the vertical direction. Each supporting part 116 has a positioning hole 116A in a circular shape.

The receptacle contact assembly 114 having the above-described structure is formed typically by pressing a thin metal plate.

In this embodiment, since the receptacle 4 requires six receptacle contact arrays 21, six receptacle contact assemblies 114 are manufactured when manufacturing one receptacle 4. The six receptacle contact assemblies 114 are manufactured as separate parts. In this embodiment, the plurality of receptacle contact assemblies 114 have the same shape. Alternatively, the plurality of receptacle contact assemblies 114 may have different shapes.

The other manufacturing method of the receptacle 4 is the same as that of the plug 5.

The first embodiment of the present disclosure is described above, and the above-described first embodiment has the following features.

As shown in FIG. 4, the plug 5 (connector) is formed by integrally molding the third plug contact array 10 (at least one contact array) including the plurality of plug contacts 14 (contacts) with the plug housing 6 (housing) that holds the third plug contact array 10 by insert molding. The outer peripheral surface 6A of the plug housing 6 includes the two width side surfaces 50 oppositely oriented to each other in the width direction orthogonal to the pitch direction of the third plug contact array 10. As shown in FIG. 13, the manufacturing method of the plug 5 includes the assembly manufacturing step (S100), the accommodating step (S110), the insert molding step (S120), and the separation step (S130). As shown in FIG. 14, the assembly manufacturing step manufactures the plug contact assembly 70 (at least one contact assembly) including the plug contact array 7, the coupling beam 71 that couples the plurality of plug contacts 14 of the plug contact array 7 with each other, and the two supporting parts 72 between which the coupling beam 71 is interposed in the pitch direction. As shown in FIGS. 15 and 16, the accommodating step accommodates the plug contact assembly 70 into the injection mold 73 in such a way that the plug contact assembly 70 is supported at both ends in the injection mold 73 by using the two supporting parts 72. As shown in FIGS. 17 and 18, the insert molding step molds the plug housing 6 integrally with the plug contact assembly 70 by insert molding in such a way that the coupling beam 71 of the plug contact assembly 70 is between the two width side surfaces 50 and separated from the two width side surfaces 50 in the width direction. As shown in FIG. 19, the separation step removes at least part of the plug contact assembly 70 in such a way that the plurality of plug contacts 14 are disjointed. In the above method, the plug housing 6 is molded in such a way that the coupling beam 71 that couples the plurality of plug contacts 14 with one another is between the two width side surfaces 50 and are separated from the two width side surfaces 50 in the width direction. As an application example, it is applicable to a multi-row connector where the plug housing 6 as a single part holds the three or more rows of the plug contact arrays 7 by insert molding. The same applies to the receptacle 4.

Further, as shown in FIGS. 15 and 16, in the accommodating step, the two supporting parts 72 are sandwiched between the stationary plate 74 and the movable plate 75 in the moving direction of the movable plate 75 relative to the stationary plate 74 of the injection mold 73, and thereby the plug contact assembly 70 is supported at both ends in the injection mold 73. The same applies to the receptacle 4.

As shown in FIGS. 17, in the insert molding step, the plug housing 6 is molded in such a way that the two supporting parts 72 of the plug contact assembly 70 are exposed outside the outer peripheral surface 6A of the plug housing 6. The same applies to the receptacle 4.

As shown in FIGS. 13 and 19, the manufacturing method of the plug 5 further includes, after the insert molding step, the supporting part removal step (S140) that removes the two supporting parts 72 of the plug contact assembly 70. The same applies to the receptacle 4.

As shown in FIGS. 18 and 19, in the insert molding step, the plug housing 6 is molded to have the penetrating hole 40 (at least one penetrating hole) that vertically penetrates the plug housing 6 in such a way that at least part of the plug contact assembly 70 is vertically exposed. In this method, at least part of the plug contact assembly 70 is easily removable when disjoining the plurality of plug contacts 14 in the separation step. Note that, however, the plurality of penetrating holes 40 may be omitted, and at least part of the plug contact assembly 70 may be punched together with a corresponding part of the plug housing 6. The same applies to the receptacle 4.

As shown in FIG. 15, in the assembly manufacturing step, the plurality of plug contact assemblies 70 are manufactured as separate parts. In this method, the plurality of plug contact assemblies 70 can be disposed closer to one another in the width direction, which contributes to reducing the size of the plug 5 in the width direction. The same applies to the receptacle 4.

As shown in FIG. 14, each plug contact 14 includes the soldering part 15, the buried part 16 and the contact part 17 in this recited order. Each plug contact 14, sequentially having the soldering part 15, the buried part 16 and the contact part 17 in this order, projects from the coupling beam 71. As shown in FIG. 22, the same applies to each receptacle contact 110. The same applies to the receptacle 4.

As shown in FIG. 10, in the manufacture of the plug 5, in the insert molding step, the plug housing 6 is molded in such a way that the contact part 17 is not elastically displaceable relative to the plug housing 6. On the other hand, as shown in FIG. 21, in the manufacture of the receptacle 4, in the insert molding step, the receptacle housing 20 is molded in such a way that the contact part 113 is elastically displaceable relative to the receptacle housing 20.

As shown in FIGS. 4 and 12, the plug 5 is formed by integrally molding the third plug contact array 10 including the plurality of contacts 14 with the plug housing 6 that holds the third plug contact array 10 by insert molding. The outer peripheral surface 6A of the plug housing 6 includes the two pitch side surfaces 51 oppositely oriented to each other in the pitch direction of the third plug contact array 10. The plug housing 6 includes the second penetrating hole 42 (at least one penetrating hole) that vertically penetrates the plug housing 6 and the second pitch extension groove 62 (at least one second pitch extension groove) extending from one to the other one of the two pitch side surfaces 51. The plurality of plug contacts 14 of the third plug contact array 10 project inside the second penetrating hole 42. The same applies to the receptacle 4.

As shown in FIG. 12, the second pitch extension groove 62 is formed to intersect with the second penetrating hole 42. The same applies to the receptacle 4.

As shown in FIG. 11, the metal piece 65 made of the same material as the plurality of plug contacts 14 is accommodated in the pitch extension divided groove 60A of the second pitch extension groove 62. The plug 5 may be surface-mounted on the connector mounting surface 3A of the upper board 3 by using this metal piece 65. The same applies to the receptacle 4.

As shown in FIG. 4, the second penetrating hole 42 (extension penetrating hole) corresponding to the third plug contact array 10 extends in the pitch direction. The plurality of plug contacts 14 of the third plug contact array 10 project inside the second penetrating hole 42. The same applies to the receptacle 4.

Further, as shown in FIG. 4, the plug 5 includes the second plug contact array 9 (first contact array) and the third plug contact array 10 (second contact array) adjacent to each other in the width direction orthogonal to the pitch direction. The plug housing 6 of the plug 5 includes the first penetrating hole 41 (first extension penetrating hole) and the second penetrating hole 42 (second extension penetrating hole) extending in the pitch direction. The first penetrating hole 41, the second plug contact array 9, the second penetrating hole 42, and the third plug contact array 10 are disposed in this recited order in the width direction. The plurality of plug contacts 14 of the second plug contact array 9 project inside the first penetrating hole 41. The plurality of plug contacts 14 of the third plug contact array 10 project inside the second penetrating hole 42. The same applies to the receptacle 4.

As shown in FIG. 21, each receptacle contact 110 includes the soldering part 111, the buried part 112 and the contact part 113 in this recited order. The contact part 113 is elastically displaceable relative to the receptacle housing 20.

Further, as shown in FIG. 21, the soldering part 111 of each receptacle contact 110 projects inside the second penetrating hole 92. Likewise, as shown in FIG. 10, the soldering part 15 of each plug contact 14 projects inside the second penetrating hole 42.

As shown in FIG. 10, each plug contact 14 includes the soldering part 15, the buried part 16 and the contact part 17 in this recited order. The contact part 17 is not elastically displaceable relative to the plug housing 6.

First Modified Example

A first modified example of the present disclosure will be described hereinafter with reference to FIG. 23. Differences of this modified example from the above-described first embodiment will be mainly described below, and redundant description thereof will be omitted. This modified example is applicable in the same manner to the receptacle 4.

In the above-described first embodiment, as shown in FIG. 9, the soldering part 15 of each plug contact 14 of the third plug contact array 10 projects inside the second penetrating hole 42. Thus, the soldering part 15 of each plug contact 14 of the third plug contact array 10 includes the soldering exposed part 15A that projects outward in the width direction from the third pitch beam 34 and is thereby observable when viewed from above, and the soldering covered part 15B that is covered with the third pitch beam 34 and is thereby not observable when viewed from above.

Figure 23:
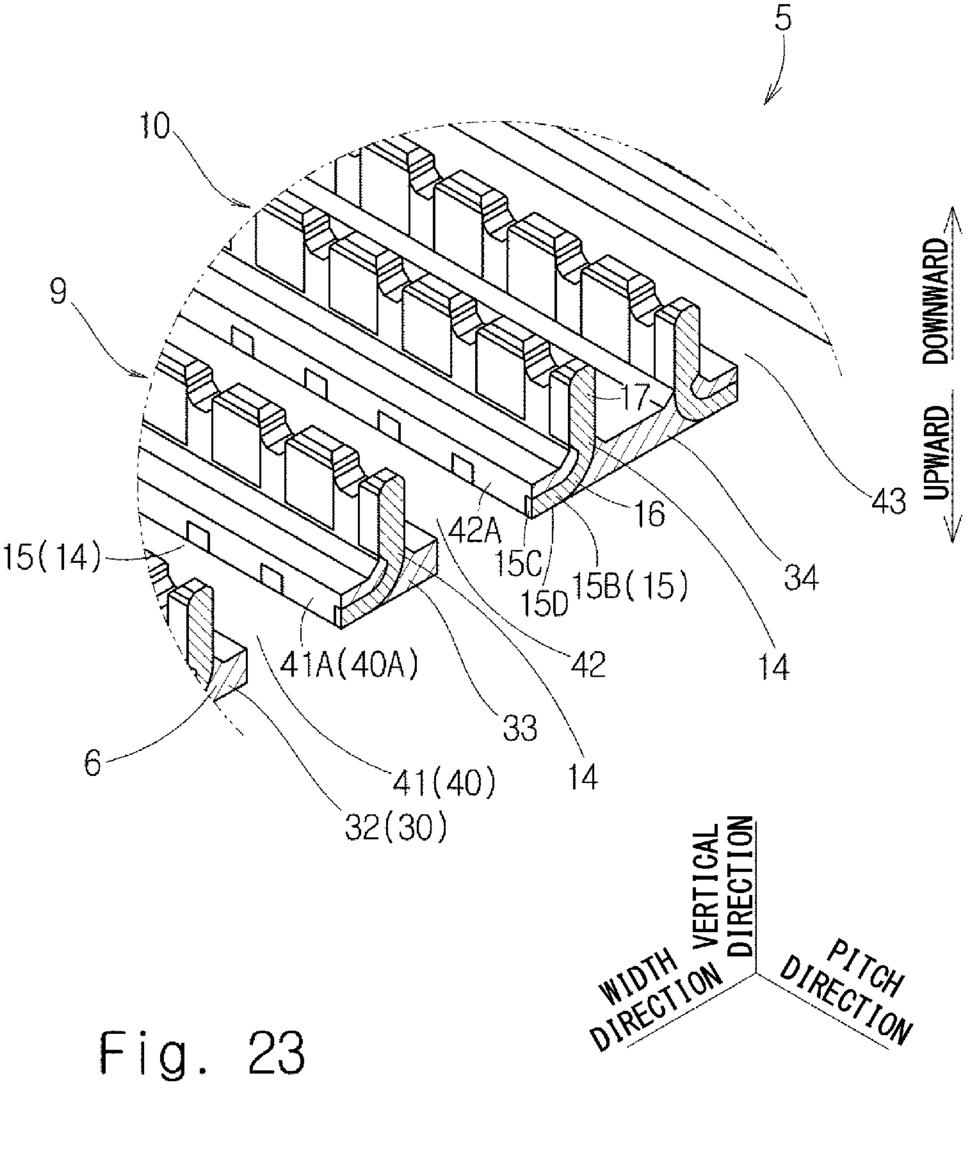
FIG. 23 is a cross-sectional perspective view of a plug connector (first modified example)

On the other hand, in this modified example, as shown in FIG. 23, the soldering part 15 of each plug contact 14 of the third plug contact array 10 does not project inside the second penetrating hole 42. In other words, the soldering part 15 of each plug contact 14 of the third plug contact array 10 does not include the above-described soldering exposed part 15A. The distal end surface 15C of the soldering part 15 of each plug contact 14 of the third plug contact array 10 is thereby substantially flush with an inner peripheral surface 42A of the second penetrating hole 42.

In this structure, when soldering the soldering part 15 of each plug contact 14 to an electrode pad, which is not shown, disposed on the connector mounting surface 3A of the upper board 3, the exposed surface 15D of the soldering covered part 15B is mainly soldered to this electrode pad.

Second Modified Example

A second modified example of the present disclosure will be described hereinafter with reference to FIGS. 24 and 25. Differences of this modified example from the above-described first embodiment will be mainly described below, and redundant description thereof will be omitted. This modified example is applicable in the same manner to the receptacle 4.

In the above-described first embodiment, as shown in FIG. 9, the first penetrating hole 41, the second plug contact array 9, the second penetrating hole 42, and the third plug contact array 10 are disposed in this recited order in the width direction, and the soldering part 15 of each plug contact 14 of the second plug contact array 9 projects inside the first penetrating hole 41, and the soldering part 15 of each plug contact 14 of the third plug contact array 10 projects inside the second penetrating hole 42.

Figure 24:
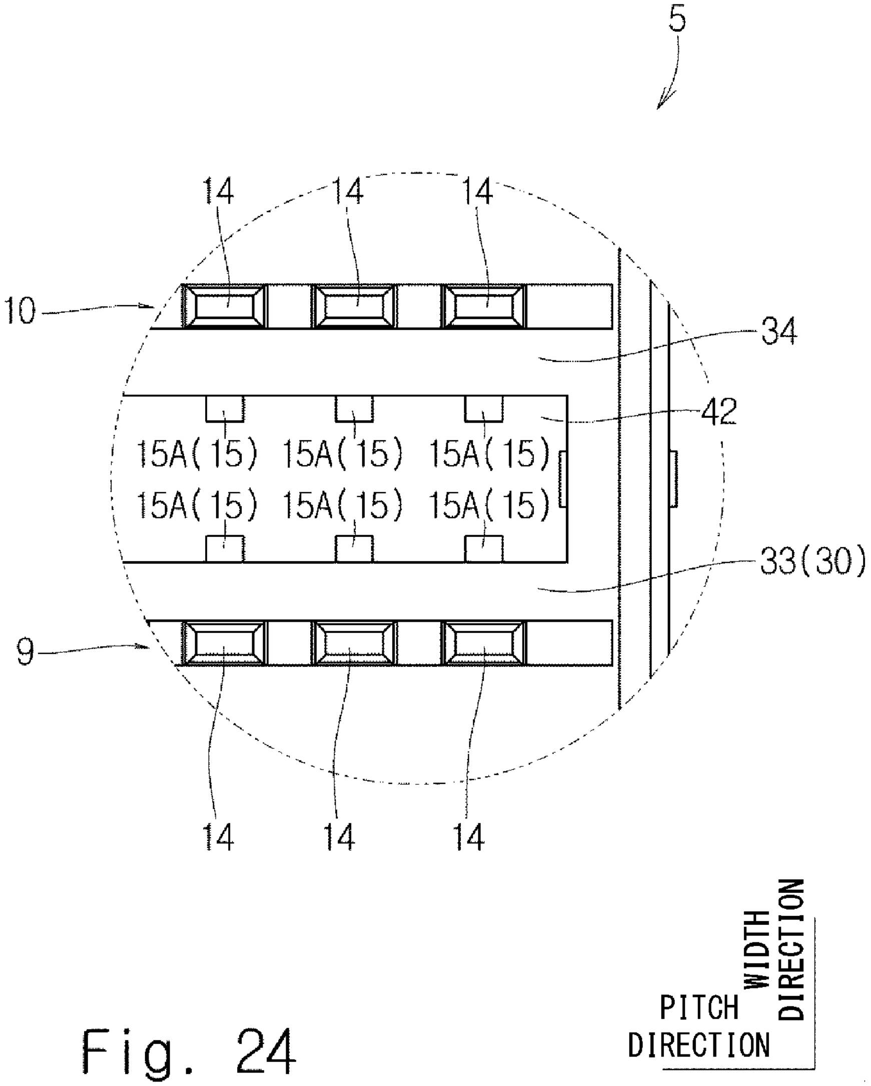
FIG. 24 is a partial plan view of a plug connector (second modified example)

On the other hand, in this modified example, as shown in FIG. 24, both of the soldering part 15 of each plug contact 14 of the second plug contact array 9 and the soldering part 15 of each plug contact 14 of the third plug contact array 10 project inside the second penetrating hole 42 disposed between the second plug contact array 9 and the third plug contact array 10. This structure eliminates the need for the first penetrating hole 41, which contributes to downsizing of the plug in the width direction.

Figure 25:
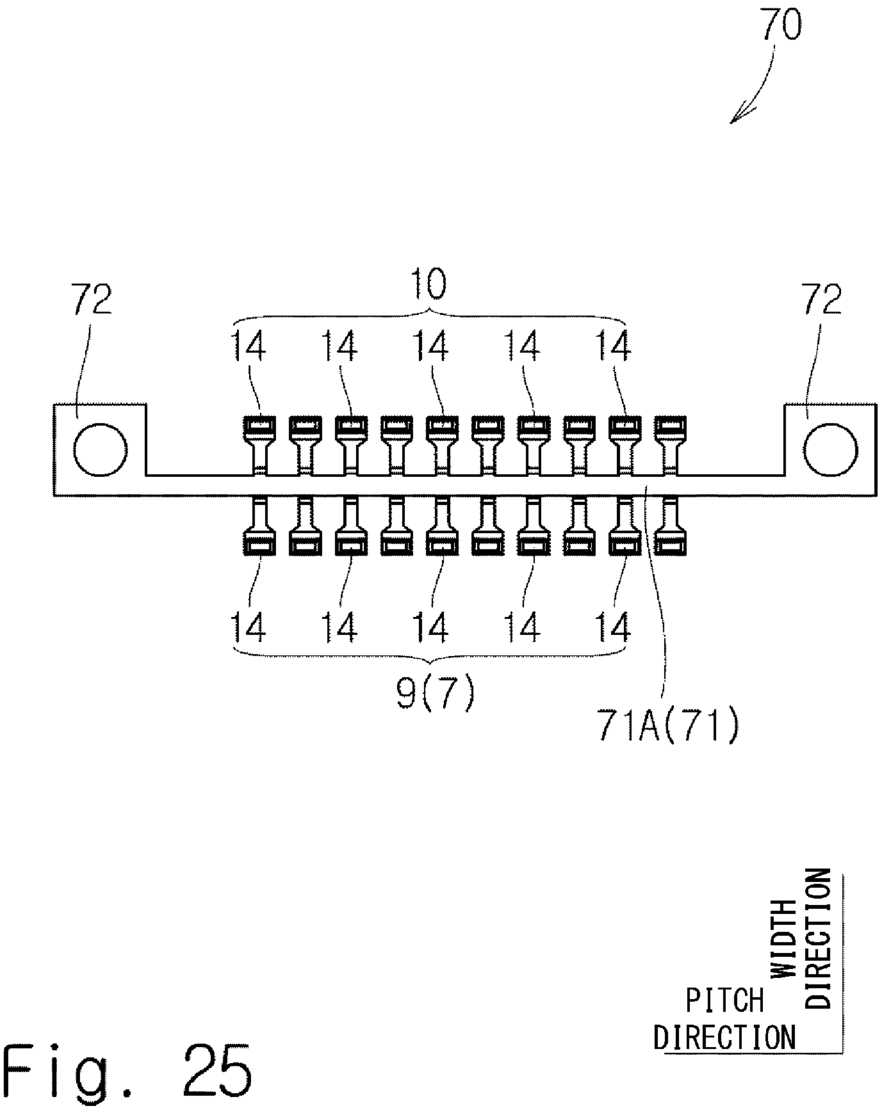
FIG. 25 is a plan view of a plug contact assembly (second modified example)

To manufacture the plug 5 of this modified example, the plug contact assembly 70 is configured as shown in FIG. 25. Specifically, the plug contact assembly 70 includes the second plug contact array 9, the third plug contact array 10, the coupling beam 71 that couples the plurality of plug contacts 14 of the second plug contact array 9 and the third plug contact array 10 with one another, and the two supporting parts 72.

Third Modified Example

A third modified example of the present disclosure will be described hereinafter with reference to FIGS. 26 and 27. Differences of this modified example from the above-described second modified example will be mainly described below, and redundant description thereof will be omitted. This modified example is applicable in the same manner to the receptacle 4.

In the above-described second modified example, as shown in FIG. 24, both of the soldering parts 15 of the plurality of plug contacts 14 of the second plug contact array 9 and the soldering parts 15 of the plurality of plug contacts 14 of the third plug contact array 10 project inside the second penetrating hole 42 disposed between the second plug contact array 9 and the third plug contact array 10. Further, the soldering parts 15 of the plurality of plug contacts 14 of the second plug contact array 9 and the soldering parts 15 of the plurality of plug contacts 14 of the third plug contact array 10 are opposed to each other in the width direction.

Figure 26:
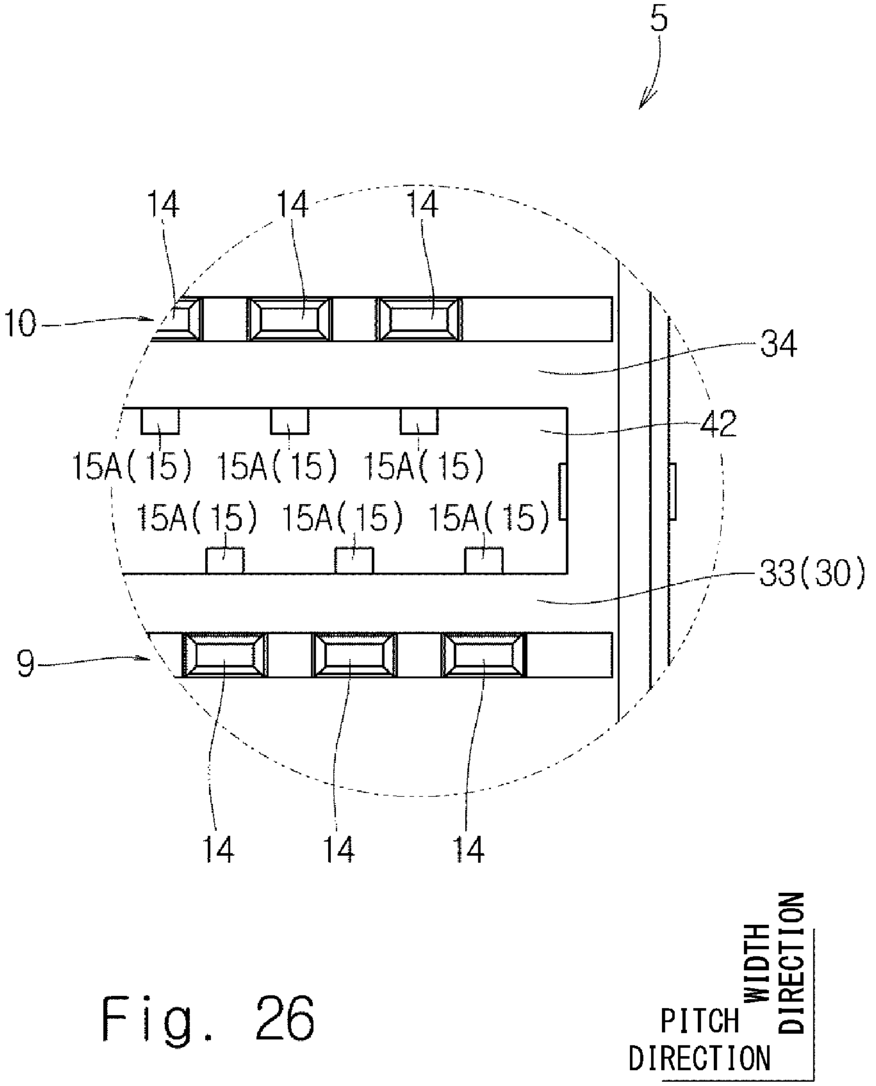
FIG. 26 is a partial plan view of a plug connector (third modified example)

On the other hand, in this modified example, as shown in FIG. 26, the soldering parts 15 of the plurality of plug contacts 14 of the second plug contact array 9 and the soldering parts 15 of the plurality of plug contacts 14 of the third plug contact array 10 are arranged in a staggered manner, not opposed to each other in the width direction. Specifically, the third plug contact array 10 is displaced by a half pitch from the second plug contact array 9 in the pitch direction. This structure also eliminates the need for the first penetrating hole 41, which contributes to downsizing of the plug 5 in the width direction.

Figure 27:
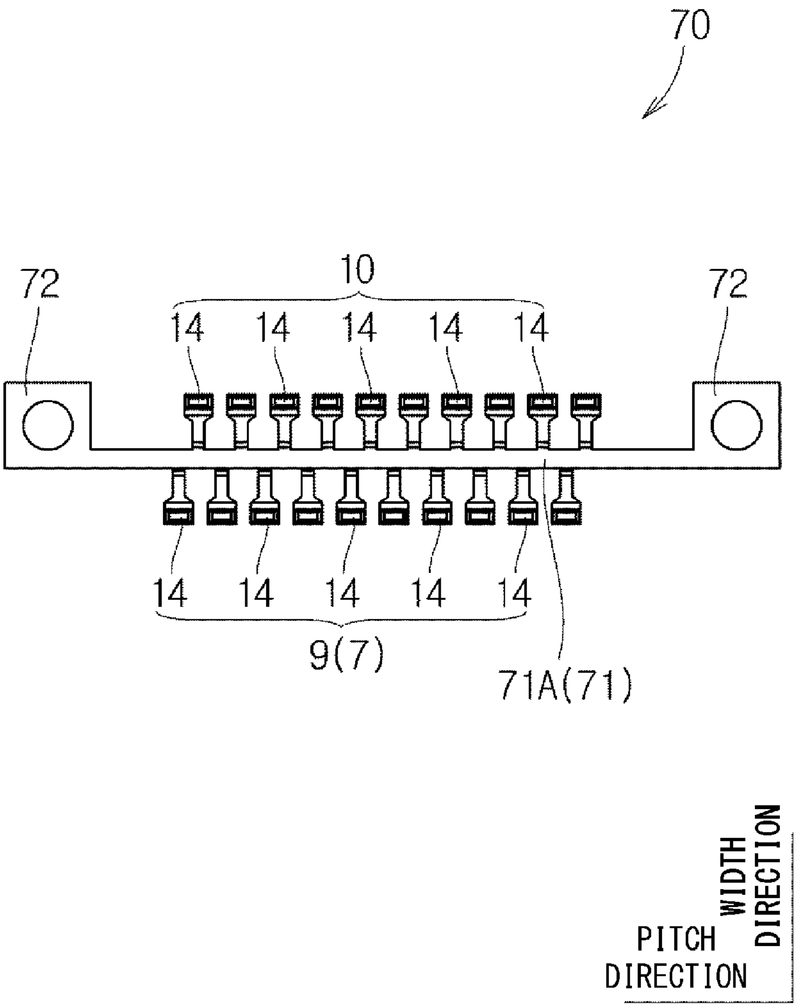
FIG. 27 is a plan view of a plug contact assembly (third modified example)

To manufacture the plug 5 of this modified example, the plug contact assembly 70 is configured as shown in FIG. 27. Specifically, the plug contact assembly 70 includes the second plug contact array 9, the third plug contact array 10, the coupling beam 71 that couples the plurality of plug contacts 14 of the second plug contact array 9 and the third plug contact array 10 with one another, and the two supporting parts 72. Further, the coupling beam 71 couples the plurality of plug contacts 14 of the second plug contact array 9 and the third plug contact array 10 with one another in such a way that the plurality of plug contacts 14 of the second plug contact array 9 and the plurality of plug contacts 14 of the third plug contact array 10 are arranged in a staggered manner.

Fourth Modified Example

A fourth modified example of the present disclosure will be described hereinafter with reference to FIGS. 28 to 30. Differences of this modified example from the above-described first embodiment will be mainly described below, and redundant description thereof will be omitted. This modified example is applicable in the same manner to the receptacle 4.

In the above-described first embodiment, as shown in FIG. 4, the second penetrating hole 42 is formed between the second pitch beam 33 and the third pitch beam 34, and the second penetrating hole 42 extends from one to the other one of the two width beams 31.

Figure 28:
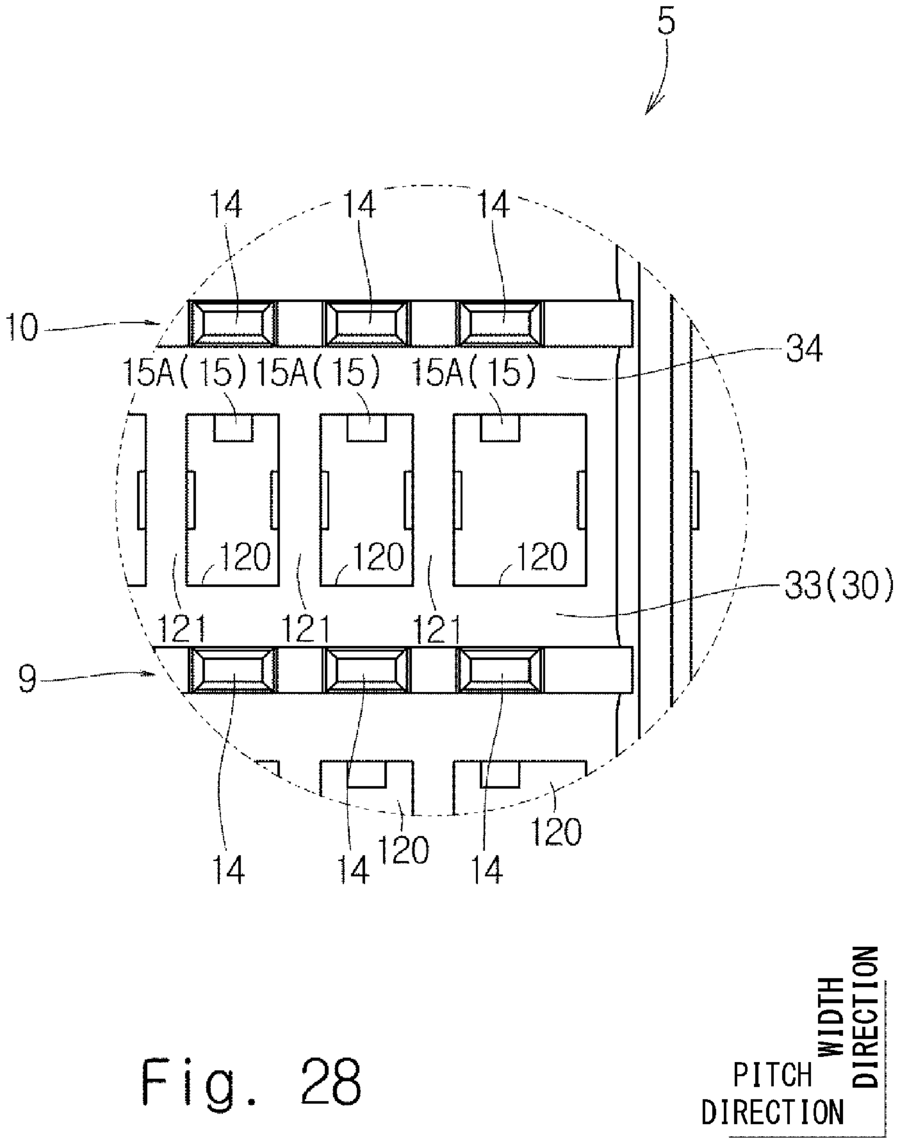
FIG. 28 is a partial plan view of a plug connector (fourth modified example)

On the other hand, in this modified example, as shown in FIG. 28, a plurality of divided penetrating holes 120 (penetrating holes) arranged in the pitch direction are formed between the second pitch beam 33 and the third pitch beam 34. "At least one penetrating hole" corresponds to the plurality of divided penetrating holes 120. The plurality of divided penetrating holes 120 are formed to be respectively adjacent to the plurality of plug contacts 14 of the third plug contact array 10 in the width direction. Thus, a plurality of reinforcement beams 121 are formed between the second pitch beam 33 and the third pitch beam 34. Each reinforcement beam 121 is formed between two divided penetrating holes 120 adjacent to each other in the pitch direction. The plurality of reinforcement beams 121 extend in the width direction and couple the second pitch beam 33 and the third pitch beam 34. The plurality of reinforcement beams 121 contribute to the mechanical strength of the plug housing 6.

The soldering parts 15 of the plurality of plug contacts 14 of the third plug contact array 10 project inside in the plurality of divided penetrating holes 120, respectively.

Figure 29:
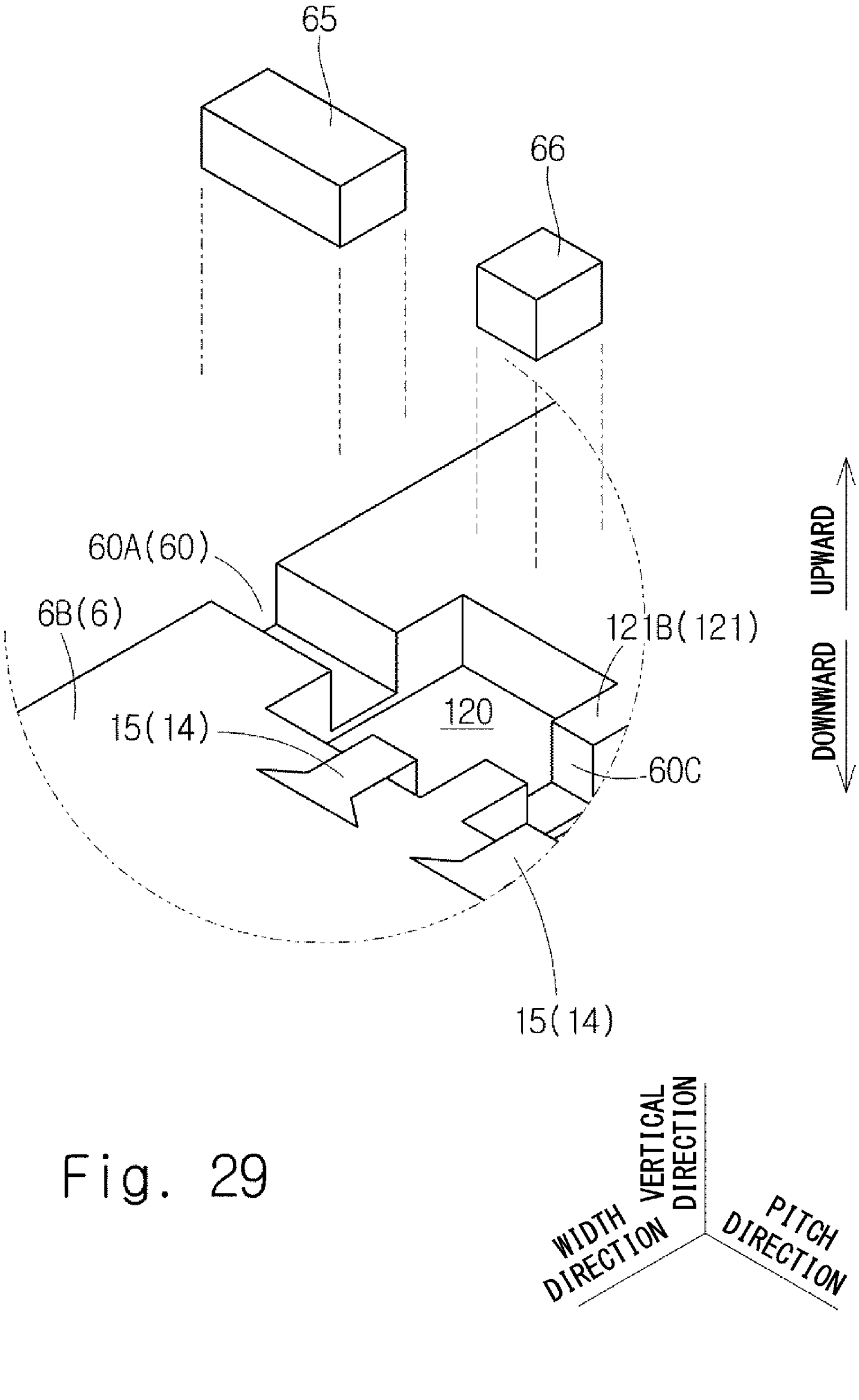
FIG. 29 is an exploded perspective view of the plug connector (fourth modified example)

Further, as shown in FIG. 29, the pitch extension grooves 60 extend to intersect with the plurality of divided penetrating holes 120. Thus, pitch extension divided grooves 60C are formed on a lower surface 121B of each reinforcement beam 121. As the metal piece 65 is accommodated in the pitch extension divided grooves 60A, a metal piece 66 is accommodated also in the pitch extension divided grooves 60C. The metal piece 66 is made of the same material as the plug contact 14. Each of the metal piece 65 and the metal piece 66 is a residue of the coupling beam body 71A of the coupling beam 71 of the plug contact assembly 70 shown in FIG. 14, which is not removed and left in the plug housing 6. The metal piece 66, just like the metal piece 65, may be omitted.

Figure 30:
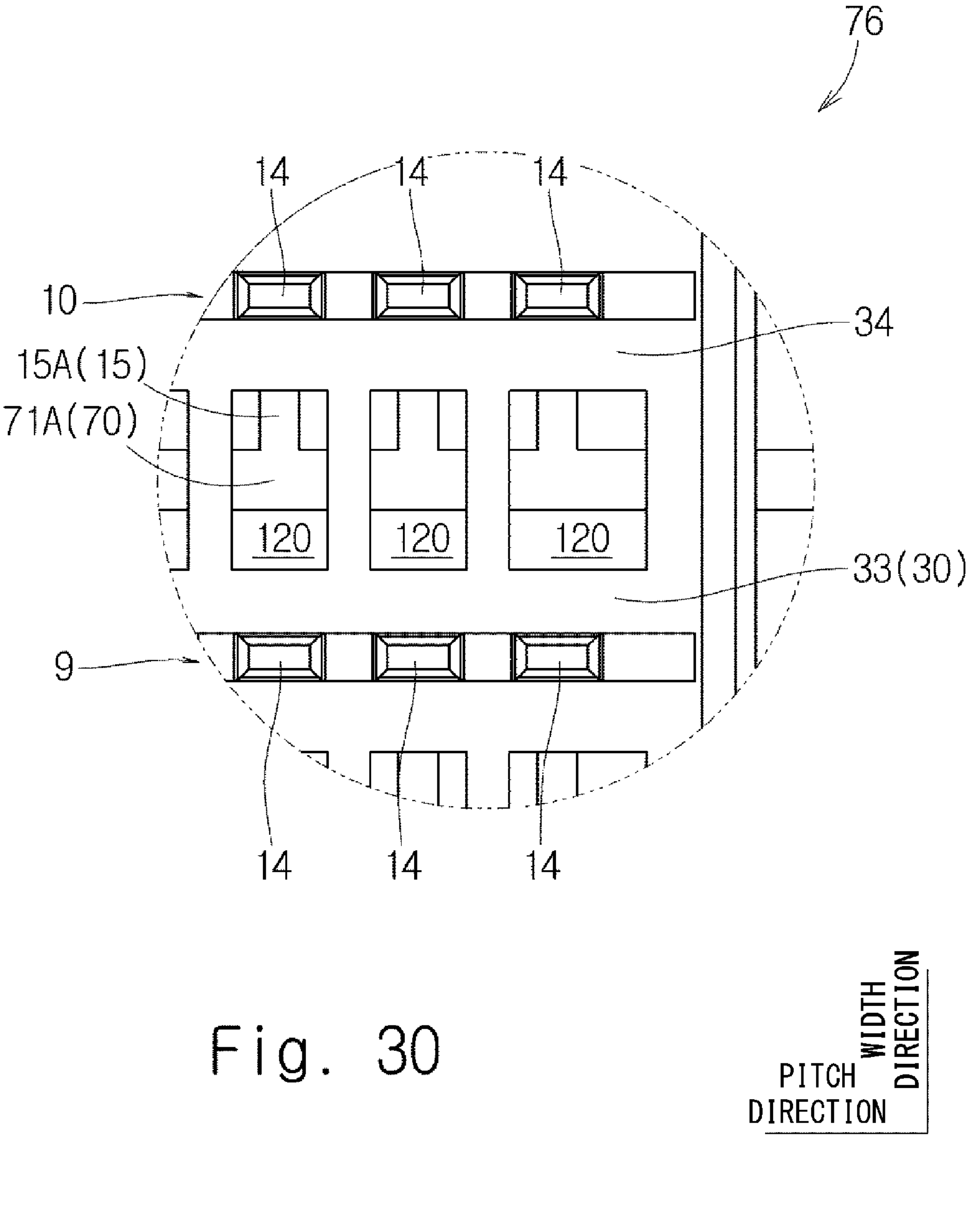
FIG. 30 is a partial plan view of a molded product (fourth modified example)

In this modified example, as shown in FIG. 30, at the stage of the molded product 76 immediately after the insert molding (S120), the coupling beam body 71A of the coupling beam 71 is vertically exposed in the plurality of divided penetrating holes 120. In the separation step (S130), a part of the coupling beam body 71A of the coupling beam 71 that is vertically exposed in each divided penetrating hole 120 is removed by cutting.

Fifth Modified Example

Figure 31:
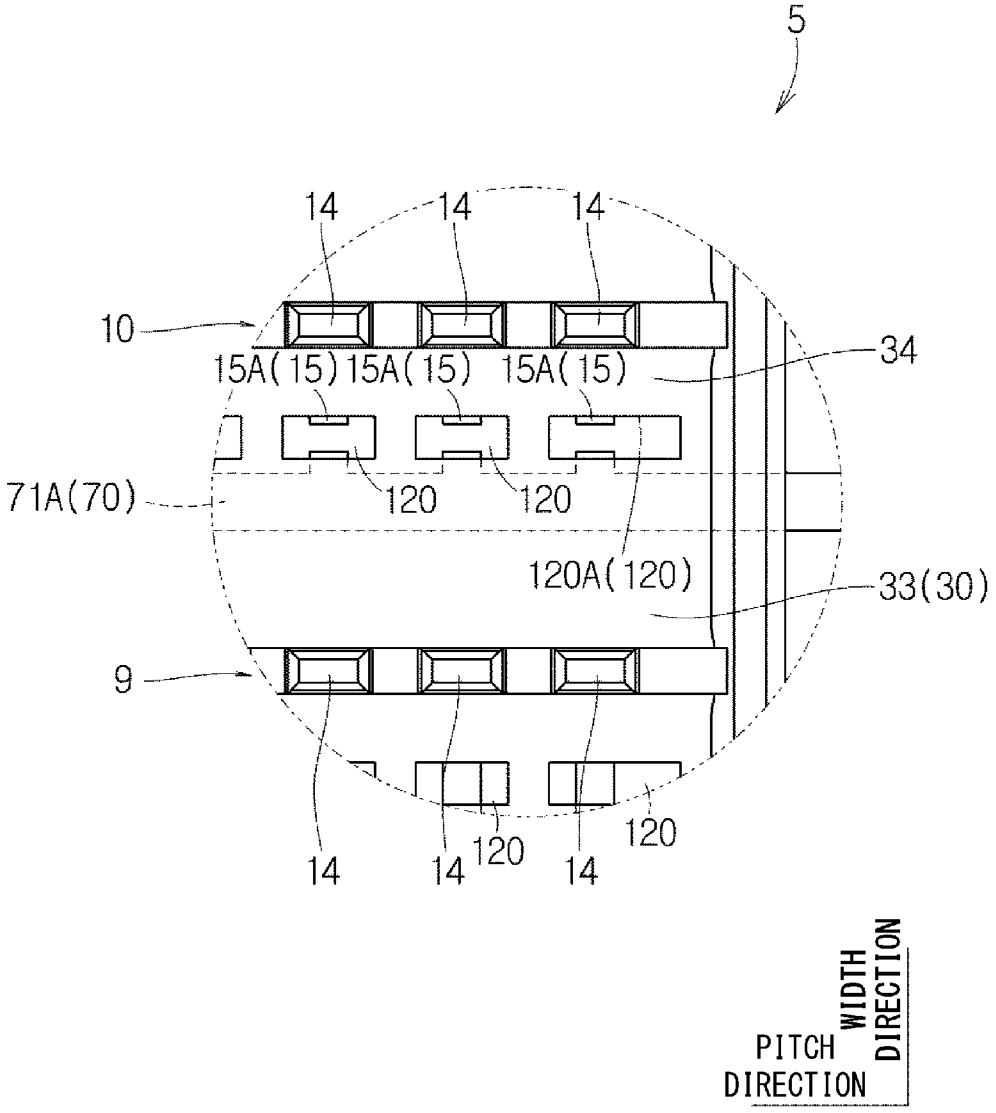
FIG. 31 is a partial plan view of a plug connector (fifth modified example)

A fifth modified example of the present disclosure will be described hereinafter with reference to FIGS. 31 and 33. Differences of this modified example from the above-described fourth modified example will be mainly described below, and redundant description thereof will be omitted. This modified example is applicable in the same manner to the receptacle 4.

In the above-described fourth modified example, as shown in FIG. 29, the pitch extension groove 60 is formed to intersect with the plurality of divided penetrating holes 120. Specifically, the plug housing 6 is molded in such a way that the coupling beam 71 of the plug contact assembly 70 intersects with the plurality of divided penetrating holes 120 in the insert molding process.

Figure 32:
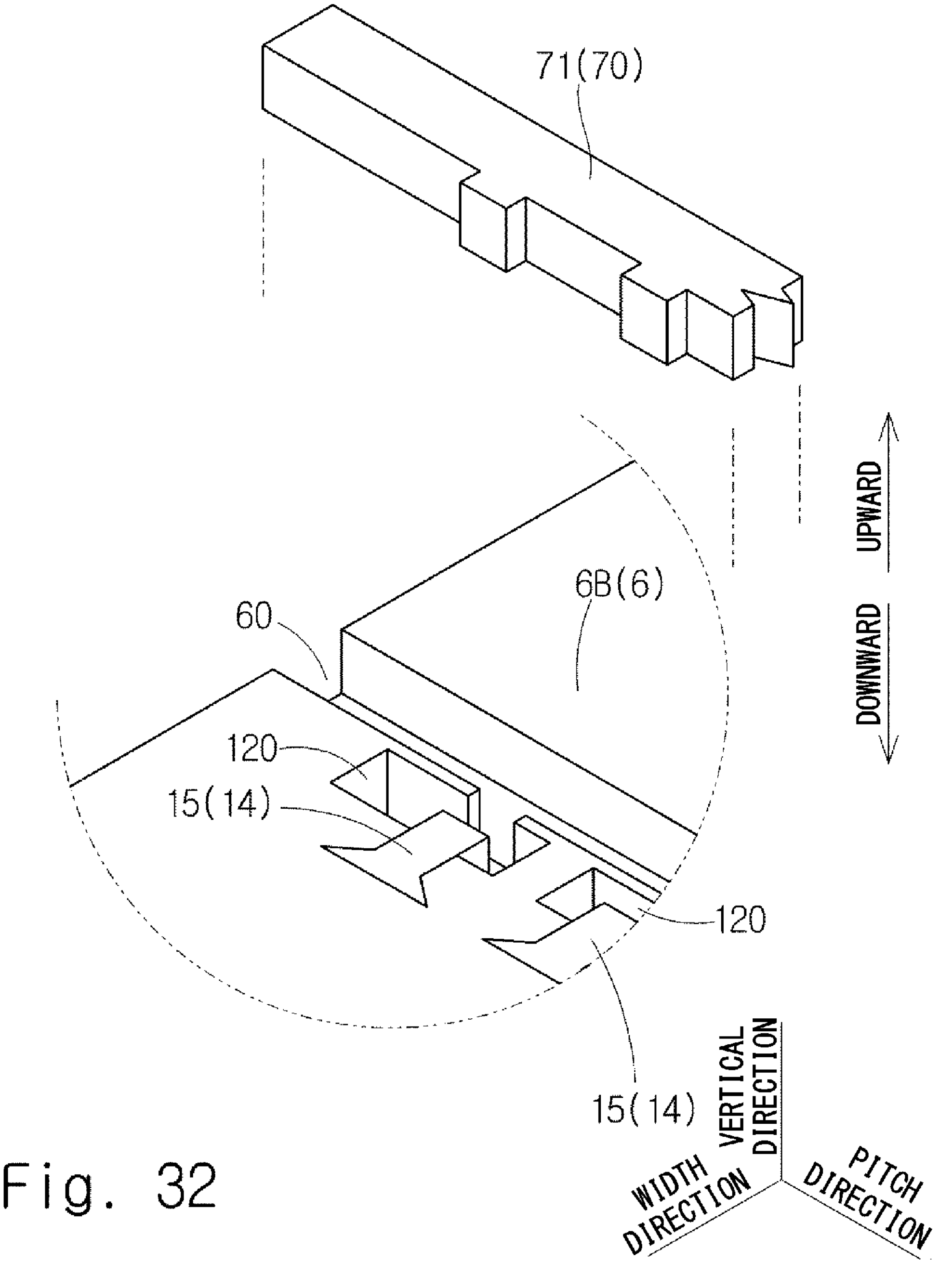
FIG. 32 is an exploded perspective view of the plug connector (fifth modified example)

On the other hand, in this modified example, as shown in FIG. 32, the pitch extension groove 60 is formed not to intersect with the plurality of divided penetrating holes 120. Specifically, the plug housing 6 is molded in such a way that the coupling beam 71 of the plug contact assembly 70 does not intersect with the plurality of divided penetrating holes 120 in the insert molding process. Thus, the pitch extension groove 60 extends in an unbroken manner in the pitch direction. In this modified example, the coupling beam 71 of the plug contact assembly 70 is not removed in the separation step (S130) and remains in the plug housing 6. Therefore, the coupling beam 71 remaining in the plug housing 6 contributes to the mechanical strength of the plug housing 6.

Figure 33:
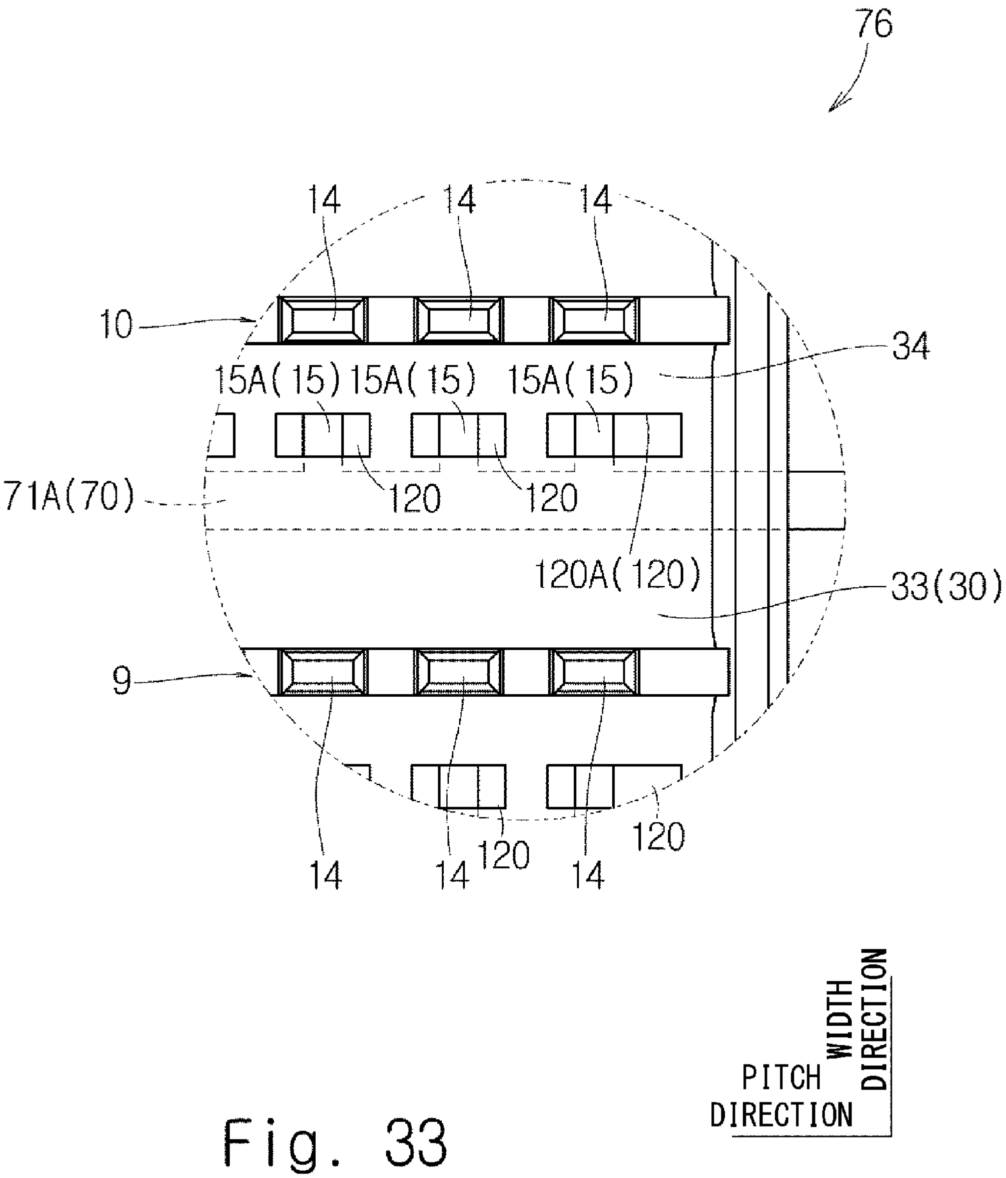
FIG. 33 is a partial plan view of a molded product (fifth modified example)

In this modified example, as shown in FIG. 33, at the stage of the molded product 76 immediately after the insert molding (S120), the soldering part 15 of each plug contact 14 is vertically exposed in the corresponding divided penetrating hole 120. In the separation step (S130), the soldering part 15 of each plug contact 14 is removed by cutting in the corresponding divided penetrating hole 120.

Sixth Modified Example

A sixth modified example of the present disclosure will be described hereinafter with reference to FIGS. 34 and 35. Differences of this modified example from the above-described fourth modified example will be mainly described below, and redundant description thereof will be omitted. This modified example is applicable in the same manner to the receptacle 4.

In the above-described fourth modified example, as shown in FIG. 28, the plurality of divided penetrating holes 120 arranged in the pitch direction are formed between the first pitch beam 32 and the second pitch beam 33. Likewise, the plurality of divided penetrating holes 120 arranged in the pitch direction are formed between the second pitch beam 33 and the third pitch beam 34.

The soldering parts 15 of the plurality of plug contacts 14 of the second plug contact array 9 and the soldering parts 15 of the plurality of plug contacts 14 of the third plug contact array 10 project outward in the width direction.

The soldering parts 15 of the plurality of plug contacts 14 of the second plug contact array 9 project inside the plurality of divided penetrating holes 120 formed between the first pitch beam 32 and the second pitch beam 33, respectively, and the soldering parts 15 of the plurality of plug contacts 14 of the third plug contact array 10 project inside the plurality of divided penetrating holes 120 formed between the second pitch beam 33 and the third pitch beam 34, respectively.

Figure 34:
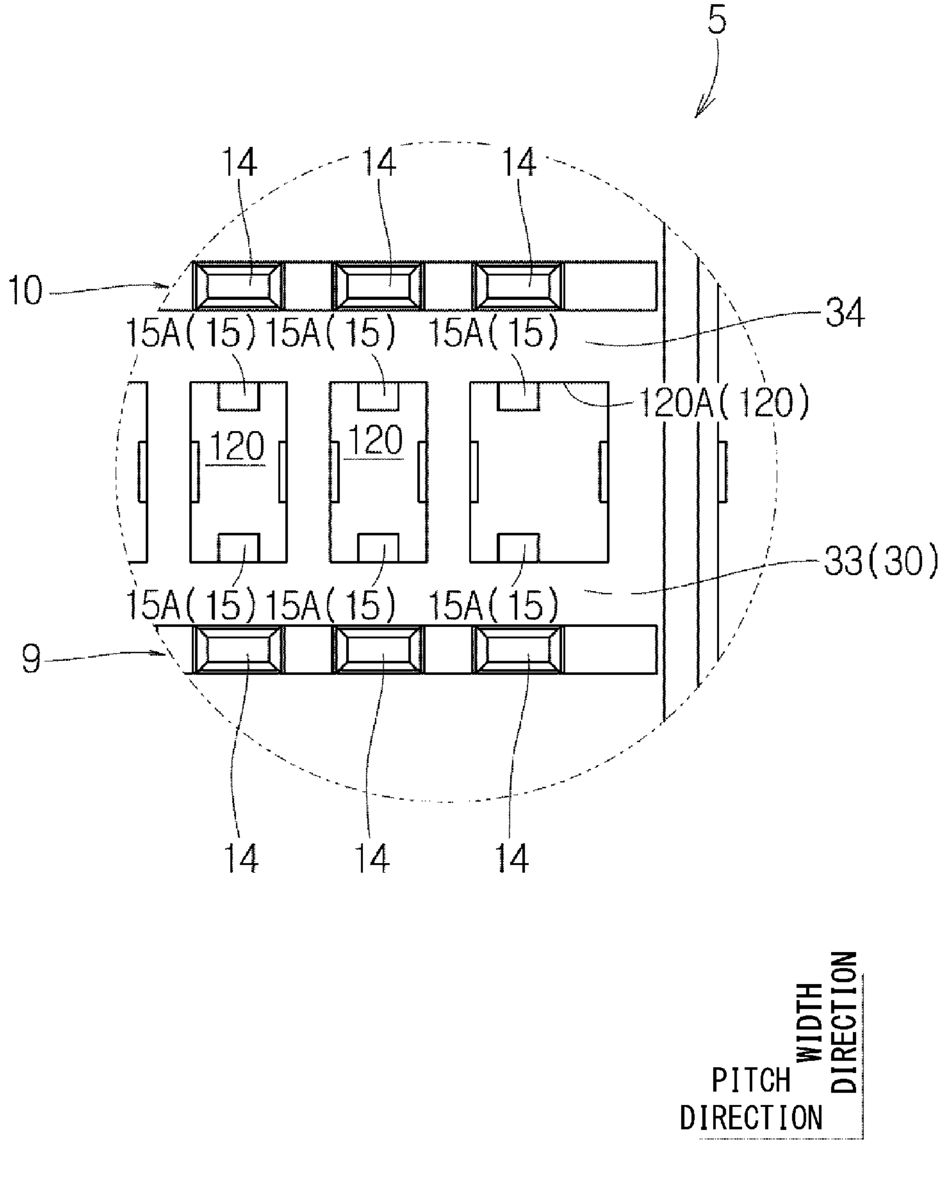
FIG. 34 is a partial plan view of a plug connector (sixth modified example)

On the other hand, in this modified example, as shown in FIG. 34, the soldering parts 15 of the plurality of plug contacts 14 of the second plug contact array 9 and the soldering parts 15 of the plurality of plug contacts 14 of the third plug contact array 10 project toward each other. Specifically, while the soldering parts 15 of the plurality of plug contacts 14 of the second plug contact array 9 project inward in the width direction, the soldering parts 15 of the plurality of plug contacts 14 of the third plug contact array 10 project outward in the width direction.

Further, the soldering parts 15 of the plurality of plug contacts 14 of the second plug contact array 9 and the soldering parts 15 of the plurality of plug contacts 14 of the third plug contact array 10 project inside the plurality of divided penetrating holes 120 formed between the second pitch beam 33 and the third pitch beam 34, respectively. This structure eliminates the need for the plurality of divided penetrating holes 120 formed between the first pitch beam 32 and the second pitch beam 33 in the fourth modified example, which contributes to downsizing of the plug 5 in the width direction.

Figure 35:
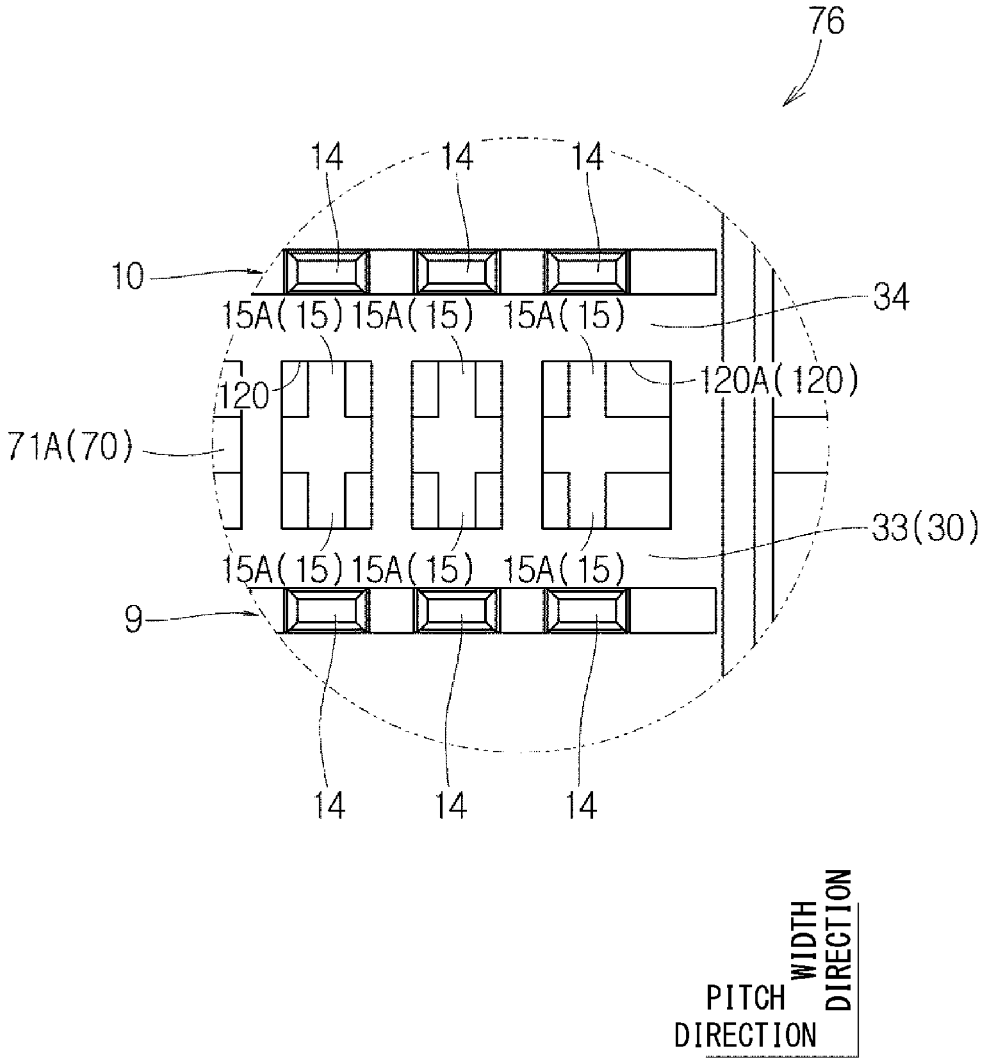
FIG. 35 is a partial plan view of a molded product (sixth modified example)

In this modified example, as shown in FIG. 35, at the stage of the molded product 76 immediately after the insert molding (S120), the coupling beam body 71A of the coupling beam 71 is vertically exposed in the plurality of divided penetrating holes 120. In the separation step (S130), a part of the coupling beam body 71A of the coupling beam 71 that is vertically exposed in each divided penetrating hole 120 is removed by cutting.

Seventh Modified Example

A seventh modified example of the present disclosure will be described hereinafter with reference to FIG. 36. Differences of this modified example from the above-described first embodiment will be mainly described below, and redundant description thereof will be omitted. This modified example is applicable in the same manner to the receptacle 4.

Figure 36:
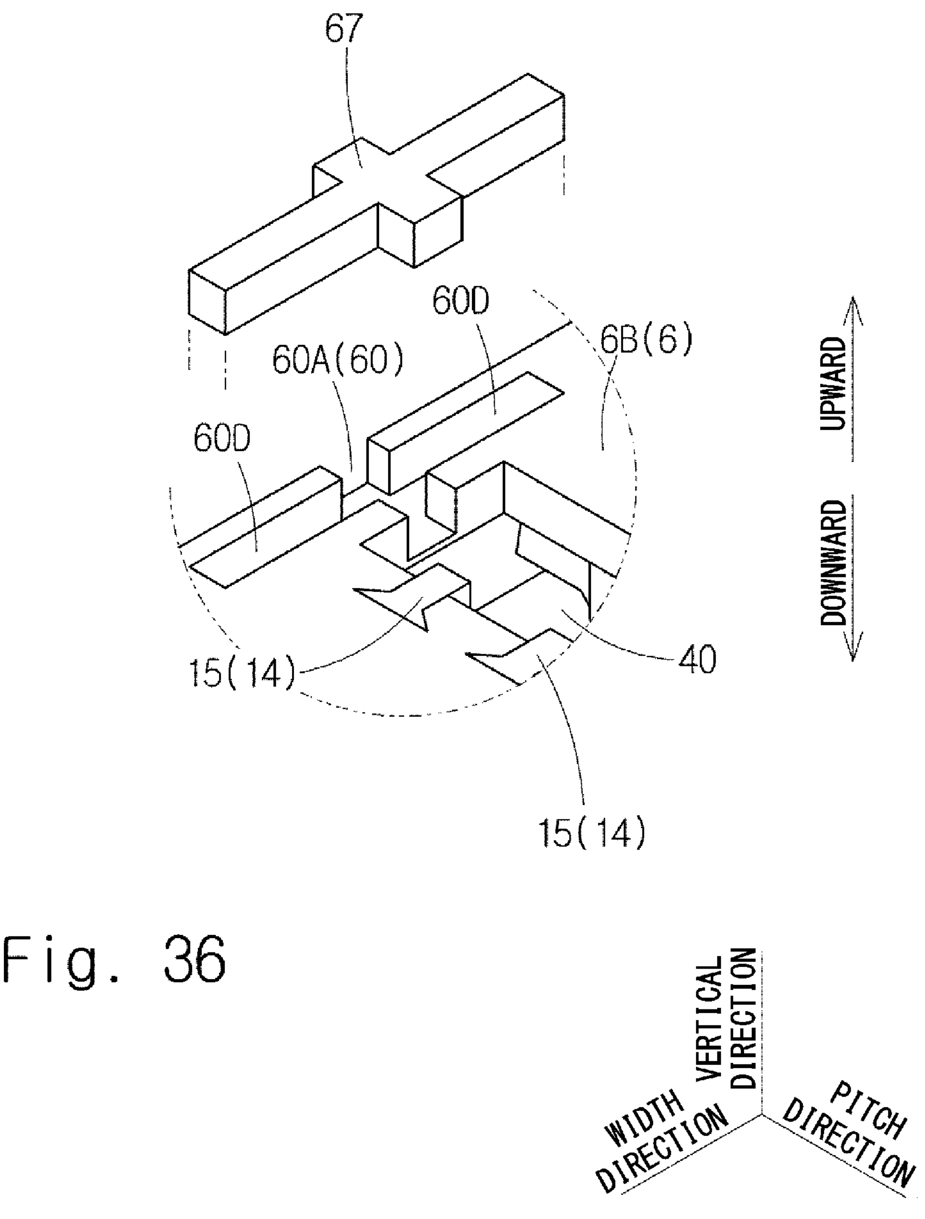
FIG. 36 is an exploded perspective view of a plug connector (seventh modified example)

In this modified example, as shown in FIG. 36, two width extensions 60D are formed on the lower surface 6B of the plug housing 6. "At least one width extension groove" corresponds to the two width extensions 60D. Either one of the two width extensions 60D may be omitted. The two width extensions 60D extend from the pitch extension divided groove 60A so as to be away from each other in the width direction. A cross-shaped metal piece 67 is accommodated in the pitch extension divided groove 60A and the two width extensions 60D. The metal piece 67 is made of the same material as the plug contact 14. The plug 5 may be surface-mounted on the connector mounting surface 3A of the upper board 3 by using this metal piece 67. The metal piece 67 may be omitted.

Eighth Modified Example

An eighth modified example of the present disclosure will be described hereinafter with reference to FIGS. 37 and 38. Differences of this modified example from the above-described first embodiment will be mainly described below, and redundant description thereof will be omitted.

In the above-described first embodiment, as shown in FIG. 21, the soldering part 111 of each receptacle contact 110 projects inside the corresponding penetrating hole 90.

Figure 37:
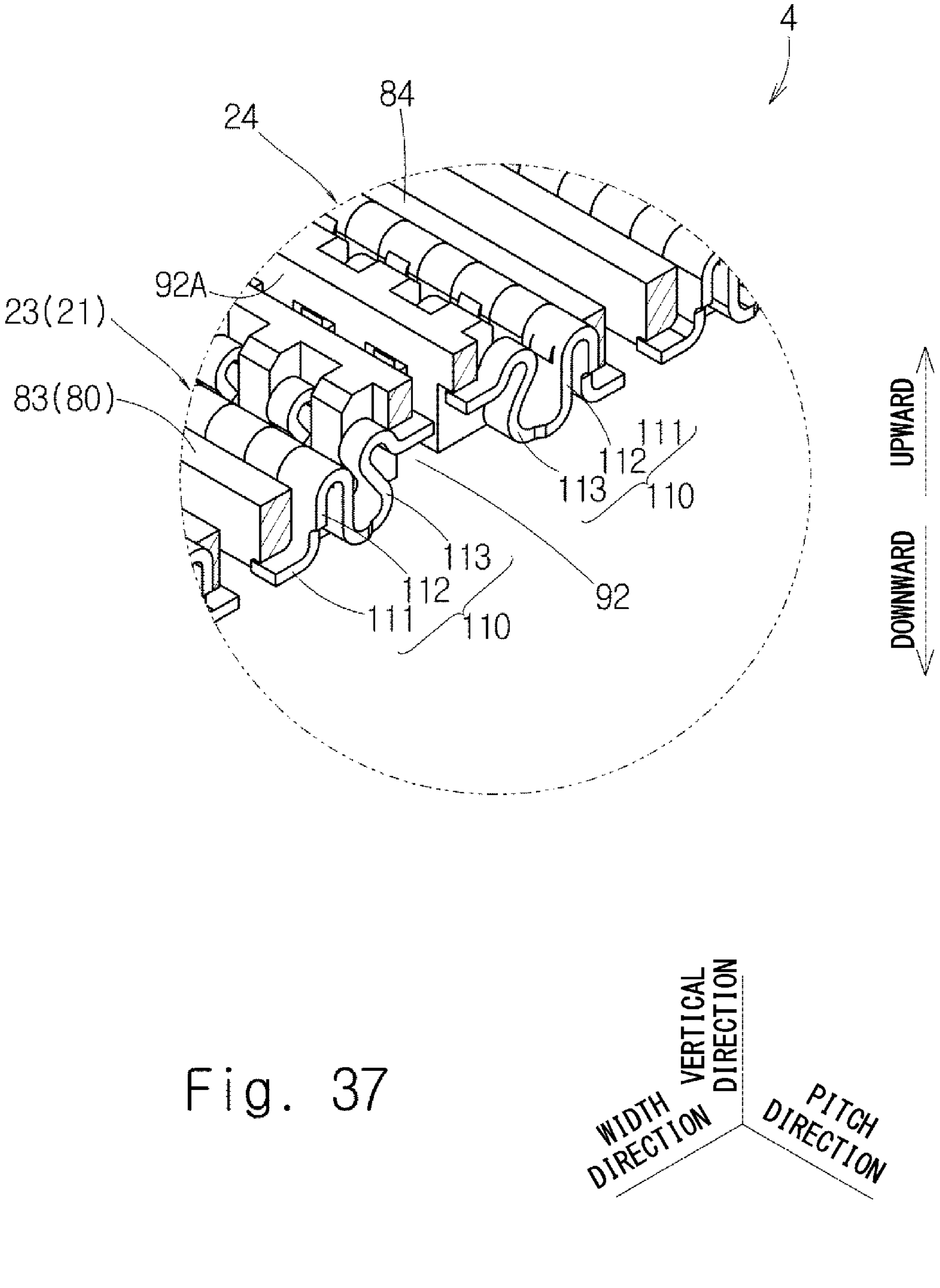
FIG. 37 is a partially cutout perspective view of a receptacle connector (eighth modified example)

On the other hand, in this modified example, as shown in FIG. 37, the contact parts 113 of the plurality of receptacle contacts 110 of the second receptacle contact array 23 and the contact parts 113 of the plurality of receptacle contacts 110 of the third receptacle contact array 24 project inside the second penetrating hole 92 between the second pitch beam 83 and the third pitch beam 84.

Figure 38:
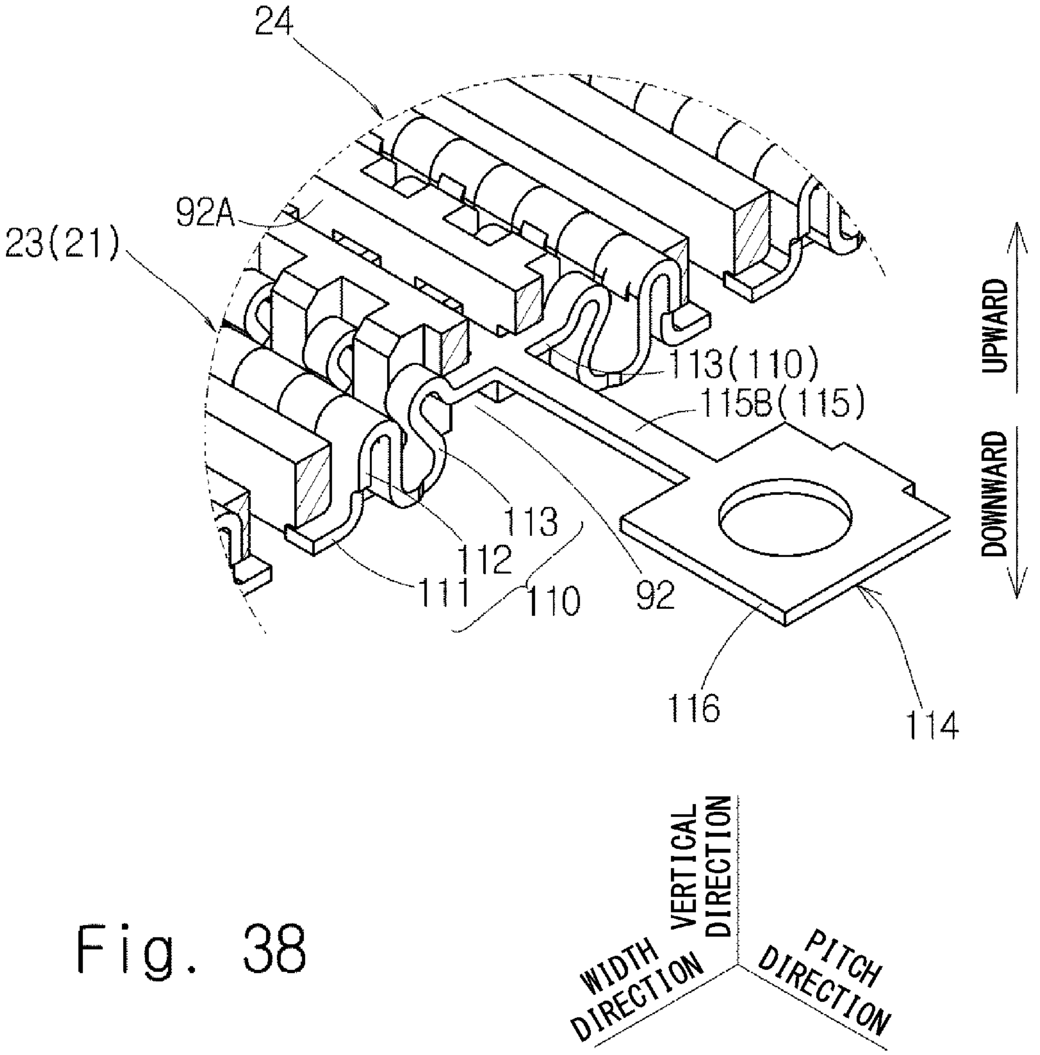
FIG. 38 is a partially cutout perspective view of a molded product (eighth modified example)
Figure 39:
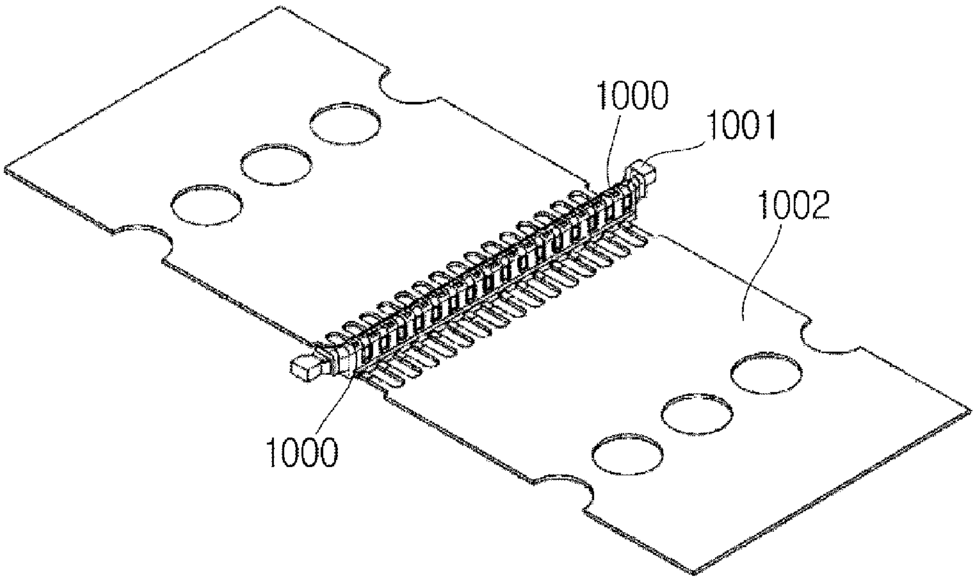
FIG. 39 is a simplified drawing of FIG. 4 of Patent Literature 1.

In this case, as shown in FIG. 38, each receptacle contact assembly 114 accommodated in the injection mold 73 in the insert molding step includes the second receptacle contact array 23, the third receptacle contact array 24, the coupling beam 115 that couples the plurality of receptacle contacts 110 of the second receptacle contact array 23 and the plurality of receptacle contacts 110 of the third receptacle contact array 24, and the two supporting parts 116 between which the coupling beam 115 is interposed in the pitch direction. The contact part 113 of each receptacle contact 110 connects to the coupling beam 115. In other words, each receptacle contact 110, sequentially having the contact part 113, the buried part 112 and the soldering part 111 in this order, projects from the coupling beam 115.

The first embodiment and the first to eighth modified examples are described above, and each of the modified examples may be combined as appropriate. For example, the first modified example is applicable also to the second to eighth modified examples, not only to the first embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector comprising:

at least one contact array including a plurality of contacts, each contact including a contact part, a buried part, and a soldering part in this order; and a housing holding the at least one contact array, the housing including an outer peripheral surface and a lower surface, the at least one contact array and the housing being integrally formed by insert molding, and the outer peripheral surface of the housing including two pitch side surfaces oppositely oriented to each other in a pitch direction of the at least one contact array, wherein the housing includes at least one penetrating hole vertically penetrating the housing, and at least one pitch extension groove in the lower surface of the housing, the at least one pitch extension groove extending from one to the other of the two pitch side surfaces, and the soldering parts of the plurality of contacts of the at least one contact array are located at the lower surface of the housing and extend in a width direction orthogonal to the pitch direction and project toward the at least penetrating hole, and project inside the at least one penetrating hole or have a sectional surface being flush with an inner peripheral surface of the at least one penetrating hole.

2. The connector according to claim 1, wherein the at least one pitch extension groove is formed to intersect with the at least one penetrating hole.

3. The connector according to claim 1, wherein a metal piece made of the same material as the plurality of contacts is accommodated in the at least one pitch extension groove.

4. The connector according to claim 1, wherein the at least one penetrating hole corresponding to the at least one contact array includes an extension penetrating hole extending in the pitch direction, and the plurality of contacts of the at least one contact array project inside the extension penetrating hole or have a sectional surface being flush with an inner peripheral surface of the extension penetrating hole.

5. The connector according to claim 4, wherein the at least one contact array includes two contact arrays adjacent to each other in the width direction, the extension penetrating hole is formed between the two contact arrays, and the plurality of contacts of one contact array of the two contact arrays and the plurality of contacts of the other contact array of the two contact arrays project inside the extension penetrating hole or have a sectional surface being flush with the inner peripheral surface of the extension penetrating hole.

6. The connector according to claim 5, wherein the plurality of contacts of one contact array of the two contact arrays and the plurality of contacts of the other contact array of the two contact arrays are arranged in a staggered manner.

7. The connector according to claim 1, wherein the at least one contact array includes a first contact array and a second contact array adjacent to each other in the width direction, the at least one penetrating hole includes a first extension penetrating hole and a second extension penetrating hole both extending in the pitch direction, the first extension penetrating hole, the first contact array, the second extension penetrating hole, and the second contact array are disposed in this recited order in the width direction, the plurality of contacts of the first contact array project inside the first extension penetrating hole or have a sectional surface being flush with an inner peripheral surface of the first extension penetrating hole, and the plurality of contacts of the second contact array project inside the second extension penetrating hole or have a sectional surface being flush with an inner peripheral surface of the second extension penetrating hole.

8. The connector according to claim 1, wherein the at least one penetrating hole corresponding to the at least one contact array includes a plurality of penetrating holes arranged in the pitch direction, and the plurality of contacts of the at least one contact array project inside any one of the plurality of penetrating holes or have a sectional surface being flush with an inner peripheral surface of any one of the plurality of penetrating holes.

9. The connector according to claim 8, wherein the at least one contact array includes two contact arrays adjacent to each other in the pitch direction, the plurality of penetrating holes are formed between the two contact arrays, and the plurality of contacts of one contact array of the two contact arrays and the plurality of contacts of the other contact array of the two contact arrays project inside any one of the plurality of penetrating holes or have a sectional surface being flush with an inner peripheral surface of any one of the plurality of penetrating holes.

10. The connector according to claim 1, wherein the contact part is elastically displaceable relative to the housing.

11. The connector according to claim 10, wherein the contact part of each contact projects inside the at least one penetrating hole or has a sectional surface being flush with the inner peripheral surface of the at least one penetrating hole.

12. The connector according to claim 1, wherein the contact part is not elastically displaceable relative to the housing.

13. The connector according to claim 1, wherein the housing includes at least one width extension groove extending from the at least one pitch extension groove in the width direction, and a metal piece made of the same material as the plurality of contacts is accommodated in the at least one width extension groove.

14. A connector comprising:

at least one contact array including a plurality of contacts; and a housing holding the at least one contact array, the at least one contact array and the housing being integrally formed by insert molding, and an outer peripheral surface of the housing including two pitch side surfaces oppositely oriented to each other in a pitch direction of the at least one contact array, wherein the housing includes at least one penetrating hole vertically penetrating the housing, and at least one pitch extension groove extending from one to the other of the two pitch side surfaces, wherein the plurality of contacts of the at least one contact array project inside the at least one penetrating hole or have a sectional surface being flush with an inner peripheral surface of the at least one penetrating hole, wherein the at least one contact array includes a first contact array and a second contact array adjacent to each other in a width direction orthogonal to the pitch direction, wherein the at least one penetrating hole includes a first extension penetrating hole and a second extension penetrating hole both extending in the pitch direction, wherein the first extension penetrating hole, the first contact array, the second extension penetrating hole, and the second contact array are disposed in this recited order in the width direction, wherein the plurality of contacts of the first contact array project inside the first extension penetrating hole or have a sectional surface being flush with an inner peripheral surface of the first extension penetrating hole, and wherein the plurality of contacts of the second contact array project inside the second extension penetrating hole or have a sectional surface being flush with an inner peripheral surface of the second extension penetrating hole.

* * * * *